United States Patent [19]
Neville et al.

[11] Patent Number: 5,803,629
[45] Date of Patent: Sep. 8, 1998

[54] METHOD AND APPARATUS FOR AUTOMATIC, SHAPE-BASED CHARACTER SPACING

[75] Inventors: Paul H. Neville, 11 Webster St., Winchester, Mass. 01890-2117; William J. Fox, Winchester, Mass.

[73] Assignee: Paul H. Neville, Winchester, Mass.

[21] Appl. No.: 818,234

[22] Filed: Mar. 14, 1997

[51] Int. Cl.⁶ .................................................. B41J 19/32
[52] U.S. Cl. .............................................. 400/304; 400/9
[58] Field of Search .................................. 400/9, 61, 76, 400/304

[56] References Cited

U.S. PATENT DOCUMENTS

| | | | |
|---|---|---|---|
| 3,552,284 | 1/1971 | Noble | 95/4.5 |
| 3,712,443 | 1/1973 | Matthews | 197/84 A |
| 3,785,258 | 1/1974 | Aron et al. | 95/4.5 |
| 4,027,313 | 5/1977 | Klepper et al. | |
| 4,291,381 | 9/1981 | Siebeck | 365/523 |
| 4,379,282 | 4/1983 | Bailey | 382/9 |
| 4,573,812 | 3/1986 | Kondo | 400/121 |
| 4,591,999 | 5/1986 | Logan | 364/523 |
| 4,661,808 | 4/1987 | Rector et al. | 340/735 |
| 4,740,093 | 4/1988 | Malcolm | 400/121 |
| 4,907,193 | 3/1990 | Masaki | 364/900 |
| 4,932,345 | 6/1990 | Takenoya et al. | 112/266.1 |
| 5,167,016 | 11/1992 | Bagley et al. | 395/144 |
| 5,185,818 | 2/1993 | Warnock | 382/54 |
| 5,237,313 | 8/1993 | Paxton et al. | 340/735 |
| 5,241,653 | 8/1993 | Collins et al. | 395/139 |
| 5,263,132 | 11/1993 | Parker et al. | 395/146 |
| 5,301,267 | 4/1994 | Hassett et al. | 395/150 |
| 5,303,334 | 4/1994 | Snyder et al. | 395/109 |
| 5,399,029 | 3/1995 | Muraoka et al. | 400/9 |
| 5,432,890 | 7/1995 | Watanabe | 395/100 |
| 5,501,538 | 3/1996 | Sawada et al. | 400/304 |
| 5,504,842 | 4/1996 | Gentile | 395/114 |
| 5,506,944 | 4/1996 | Gentile | 395/114 |
| 5,609,427 | 3/1997 | Takasawa et al. | 400/304 |

FOREIGN PATENT DOCUMENTS 2 016 189  9/1979  United Kingdom.

OTHER PUBLICATIONS

David Kindersley et al., *Printing World*, Oct. 31, 1979 at 12.
Olav Martin Kvern, *Adobe Magazine*, Mar./Apr. 1996 at 69.
Avi C. Naiman, "High–Quality Text for Raster Displays," *University of Toronto Thesis*(1985).
Richard Rubinstein, *Digital Typography*, 115–131 (1988).
David Kindersley, *Seybold Report*, Apr. 13, 1987.

*Primary Examiner*—Edgar S. Burr
*Assistant Examiner*—Steven S. Kelley
*Attorney, Agent, or Firm*—Cesari and McKenna, LLP

[57] ABSTRACT

Apparatus and methods for setting intercharacter spacing for display, rendering or other output of strings of adjacent characters utilize character shapes to set final spacing amounts. The invention stores specifications of characters to be rendered adjacently along an axis, the specifications including a font associated with each of the characters, each character having an associated interior portion defined by a contour portion, and adjacent characters having opposed contour segments separated along the axis by at least one intercharacter contour distance at an initial (e.g., default) intercharacter spacing; and sets a final intercharacter spacing between pairs of adjacent characters along the axis based on a portion of the intercharacter contour distances; the invention may further utilize statistical analysis of these distances in setting spacing.

41 Claims, 29 Drawing Sheets

AuToKern

FIG. 13

AuToKern

FIG. 15

METHOD AND APPARATUS FOR AUTOMATIC, SHAPE-BASED CHARACTER SPACING

FIELD OF THE INVENTION

The present invention relates to the spacing of characters, as used in the traditional typesetting process, on computer displays, for printing devices, or in connection with any other process that controls the placement of characters, shapes or glyphs, where the optical placement of the characters is positioned for various typographic visual styles.

BACKGROUND OF THE INVENTION

In traditional metal type, each character of a font was cast as separate piece. Character spacing was then determined by the set or set-width—i.e., the width of the individual character. Letterspacing (adding space between the characters) was achieved by inserting small pieces of metal between the characters. A "kern," on the other hand, was a part of a character that extended past the set width, and thus into the next character's space. The term kerning, which has come to refer to the addition or subtraction of space between characters (so that, for example, the limb of one projects over or under the body of another), originated with these metal type kerns. To set characters closer together, the metal body of a character would be filed down, or two characters would be cast as a single unit.

In today's digital typesetting environments, the fonts, while represented electronically, are still designed in a manner similar to that of metal type, with features that take advantage of overlapping character's widths. Rendering information for a pair of adjacent characters typically includes the information shown in FIG. 1 for each character: an origin point $O_T$, $O_x$, the y value of which defines the character baseline B; a mathematical description of the character (i.e., the contour of the character) at a size of one point, relative to the origin point; an offset amount where the next character's origin point would start (i.e., the distance $O_x - O_T$); a maximum font height; a minimum font height (below the baseline B); and a kerning lookup table that stores shift amounts (positive or negative) as defined by the font designer for a one-point font. The height and/or length associated with each character, also as shown in FIG. 1, may be used to establish kerning offsets.

The distance between the character origin and the character's leftmost edge is called the sidebar, which in most cases is a positive value. The character typically also includes a sidebar on the right edge of the character as well. Again, this sidebar is usually extra space between the character's rightmost edge and the offset value. These sidebars are determined by the font designer, and represent an attempt to provide optically even spacing between all of the characters in the font; two sidebars for each of the two illustrated characters are indicated at $SB_1$, $SB_2$, $SB_3$, $SB_4$. The process of defining sidebars always reflects compromise, since characters differ greatly in shape. An example is a lower-case f, where the offset is adjusted such that the character's right edge extends past the offset. This is done so that lower-case characters do not have an optical gap when following other lower-case characters. This improves character spacing but also introduces other problems, as illustrated in FIG. 2A for a default font spacing. In this instance, the offset has acted to reduce the visual spacing of the space character, thus reducing overall legibility.

Application programs that use digital fonts determine character spacing by placing the first character in a sequence relative to its origin point, and then using the character offset to determine the origin point for the next character in the sequence. For applications that support kerning, a lookup is performed, and the appropriate amount of space is either added or subtracted from the character offset, as shown in FIG. 2B; a displacement $D_1$ is added between the f and space characters, and a displacement $D_2$ is subtracted between the space and B characters. Typical fonts today have between 150 and 1,500 kerning pairs per font, with very extensive fonts containing perhaps 3,000 kerning pairs.

One disadvantage of a lookup-table system is sheer size: with a typical font composed with 256 characters, symbols and numerals, it would be necessary for the table to contain 65,536 kerning pairs (256×256) in order to account for all possible adjacent character combinations. These entries, moreover, would be useful only for that one particular font, and would not take into account kerning between two separate fonts, or even between the roman and italic fonts of the same typeface.

Naiman, *High-Quality Text for Raster Displays* (1985) discloses an approach called "sector kerning," which defines sectors within a character that mimic a crude representation of the character's outline. To find the spacing for consecutive characters, the distance that another character can penetrate is calculated, and the spacing is adjusted so that the two adjacent sector edges will just touch. This process requires the font designer to set up sectors for every character in the font.

U.S. Pat. No. 4,591,999 discloses an approach to character spacing wherein each character of each font is assigned four digital space values relating to the shape of each character (similar to sector kerning), and those predetermined values to determine where characters would touch and, therefore, how much space to remove between the characters. This technique requires initial setup of these values before being kerning data can be produced. The approach is further disadvantageous in that the number of values needed to account for thin serifs and other character parts is substantial, making it impractical to define more the a handful of values per font.

Another approach to character spacing (see Kindersley & Wiseman, Printing World, Oct. 31, 1979 at 12) measures characters from their centers—in all directions—which takes into account the interior space of the character. The spacing is achieved by matching the center-to-center distance of each character. Characters with low centers are automatically kerned with those having high centers. A disadvantage of this system is that by measuring from the center, the smaller portions of the character shape such as serifs are not considered. As a result, this system works well only on very loose letterspacing, and does not work well on tighter letterspacing (where smaller character parts have larger impacts on character spacing).

U.S. Pat. No. 4,291,381 describes classifying the font of characters into a series of groups, and then applying a kerning or spacing value based on the group into which the character falls. Unfortunately, letters seldom have similar external shapes, and thus kerning amounts fail to account for subtle shape variations. Another disadvantage is that characters must to be preclassified into groups and values assigned before spacing can be adjusted.

U.S. Pat. No. 4,932,345 discloses calculating the space between characters when a character is set so that they just touch. A default area is calculated and characters are adjusted so similar areas intervene between each character pair. This method does not account for the interior spaces of characters, such as the space inside a capital "C," which would adversely affect the area calculation. It further does not consider character shape, which is important in determining proper optical character spacing.

U.S. Pat. No. 5,399,029 describes a spacing method whereby all characters are adjusted so they would just touch, and a set amount of space is then added between all characters. This crude method does not produce even optical spacing since it relies solely only on the character's extremity to determine its spacing.

U.S. Pat. No. 5,432,890 discloses finding the distance between characters at default font placement (by means of sector kerning), then determining the minimum value to make characters just touch, and then comparing that value against a predetermined value. If the minimum distance is larger than the predetermined value, the spacing is reduced to match the predetermined value. This method, similar to that of the last-described patent, relies only on one measurement to adjust character placement, and does allow for automatically increasing kern amounts. It fails to produce optically even character spacing because of its reliance on a single predetermined value against which kerning values are compared.

U.S. Pat. No. 5,501,538 discloses an approach termed "character face overlap" based on overlap of character "frames" or bounding boxes. This approach considers three attributes: where the characters touch, where they do not touch, and "overlaps" of the character bounding boxes. The disclosed rule-based system of "fuzzy reasoning" and "inference" oversimplifies the process of character spacing into groups of "large," "medium," and "small" amounts of "character spacing degree." While perhaps useful for Chinese or certain Japanese character systems, this process would be much less appropriate for Roman, Greek, Cyrillic, or Arabic languages where bounding-box overlap would be less pronounced for the majority of character-pair combinations.

DESCRIPTION OF THE INVENTION

OBJECTS OF THE INVENTION

It is, accordingly, an object of the present invention to provide a rapid, automatic approach to optical spacing (i.e., placement or kerning) of characters, shapes, glyphs, or objects.

It is another object of the invention to provide an automatic approach to spacing that produces various optical styles commonly accepted as standards for the setting of typography in graphic design and advertising applications.

It is a further object of the invention to provide an automatic approach to spacing that requires no previous setup.

It is still a further object of the invention to dispense with the need for lookup tables of kerning pairs or predetermined values.

It is yet another another object of the invention to address both the subtraction and addition of space between characters.

Still another object of the invention is to account for space or blank characters.

Yet another object of the invention is to facilitate the optical alignment of characters or shapes of vertically aligned text in columns.

It is yet another object of the invention to control the spacing of characters on computer displays, for printing devices, or in connection with any other device that controls the placement and/or display of characters, shapes, or glyphs.

It is another object of the invention to space characters based on actual character shapes in a manner amenable to vertical or horizontal placement, or placements reflecting combinations thereof.

It is a further object of the invention to provide proper placement for characters that are adjacent, but which do not intersect.

Still a further object is to facilitate placement with various fonts, combinations of mixed fonts, mixed font sizes, or different size/font combinations.

Yet another object is to provide for efficient character spacing such that characters may be placed closer together and space thereby saved.

It is yet another object of the invention to provide a character-spacing technique that analyzes actual overlaps of character outlines—rather than bounding boxes—to produce optically correct character spacing based on adjacent character shapes.

BRIEF SUMMARY OF THE INVENTION

The present invention provides, in a first aspect, a process for controlling the placement of characters on a machine, display device, printer, or other output medium or system (hereafter, generically, an "output device") that displays, prints, projects, or uses characters, shapes, or glyphs (hereafter collectively referred to as "characters"). In accordance with the invention, character spacing is determined by the actual outline or the interaction of shapes of adjacent character pairs. The different parts of the characters, and how these character shapes interact as they touch and overlap, are determining factors in the final character spacing. Through analysis of character overlap a statistical determination is made, a spacing value is calculated based thereon, and then the characters are spaced accordingly.

The invention may analyze a number of factors in determining a final character spacing, including the relative sizes of the characters (generally, the larger the type size, the closer together the characters should be spaced); the type of font (e.g., condensed type requires more spacing to be legible than the same size font in an uncondensed format); the visual style; the portions of adjacent characters that touch or overlap at different values; and the percentage of adjacent characters that are close to one another as compared with the percentage of such characters that are far away from one another (the "close/far ratio"); the number of close points that would intersect or touch the next character with the characters spaced so they just touch; the length of serifs (for serifed fonts); and the number of serifs that would intersect or touch the next character with the characters spaced so they just touch.

Briefly, the characters are entered by a user (e.g., by means of a keyboard, such that codes representing the selected characters are stored in the memory of a computer), and their outlines sampled at a variable sample rate. The actual sample values are calculated relative to the total height of the font. The sampling returns points corresponding to left-side or character-minimum values, right-side or character-maximum values, and flag values where no interceptions occur. Next, for each scan line, the rightmost intercept of the first character is compared to the leftmost intercept of the second character, and the difference stored in an Intercharacter Distance array. The smallest value of the array is then subtracted from each entry of the array (so that, if the array were used to specify intercharacter spacing, the characters would just touch).

Next, the degree of actual character overlap is assessed at varying 'intersection zones,' i.e., superpositions to increasing degrees of the character bounding boxes until the bounding boxes are completely coextensive (i.e., fully overlap). The actual character overlaps are measured as a percentage of the intersecting characters' character heights. The overlap percentages determine which of the entries in the Intercharacter Distance array are to be analyzed statistically. (Alternatively, a fixed fraction of the entries, or all entries falling below a fraction of the maximum intercharacter distance, can instead be used.) A statistical measure, such as standard deviation, is calculated for those entries that are to be analyzed.

A default spacing value for the characters is established (e.g., calculated as a percentage of the total font height). Different spacing rules, based on the default value, are considered depending upon the character pair combination and the character shapes that intersect one another. The general rule is to subtract the standard deviation from the default spacing value; the difference is then itself subtracted from a character touch value, or the value required to offset the second character, from the font's default spacing, to the point at which the characters would just touch. The result, representing the final spacing value, is then subtracted from the width value of the first character. This last value is used as the character displacement, measured from the origin of the first character to the origin of the second character. This value is stored and the spacing process is repeated until all character pairs have been considered. The characters are then imaged at the locations dictated by the spacing values.

In a second aspect, the invention comprises a hardware facility for executing the foregoing functions. The facility may contain means for displaying, rendering or otherwise outputting the characters spaced in accordance herewith. In particular, an apparatus for setting character placement for rendering on an output device in accordance with the invention may include means for storing specifications of at least two characters to be rendered adjacently along an axis, where the specifications include a font associated with each of the characters, each character has an associated interior portion defined by a contour portion, and adjacent characters have opposed contour segments separated along the axis by at least one intercharacter contour distance at an initial (e.g., default) intercharacter spacing; and means for setting a final intercharacter spacing between pairs of adjacent characters along the axis, the final intercharacter spacing being set based on a portion of the intercharacter contour distances.

BRIEF DESCRIPTION OF THE DRAWINGS

The foregoing discussion will be understood more readily from the following detailed description of the invention, when taken in conjunction with the accompanying drawings, in which:

FIG. 13 shows the appearance of a word rendered at a default, unkerned spacing;

FIG. 15 shows the appearance of the word shown in FIG. 12, this time rendered in accordance with the invention.

DETAILED DESCRIPTION OF THE PREFERRED EMBODIMENTS

Refer first to FIGS. 3A–3D, which collectively illustrate, in flow-chart form, a representative implementation of the invention. In a first step 300, a string of characters is entered; as discussed in further detail below, this step is typically accomplished using a keyboard or other data-entry device, actuation of which results in computer storage of ASCII or other codes corresponding to the selected characters. Preferably, the user is accorded the option of selecting a point size and font style as well (steps 302, 304), although an application (such as a word processor or desktop publishing system) incorporating the invention may include provision for selection of a default size and font in the absence of user specification. The user may also select a spacing style (306), which affects ultimate character placement as described below; and a control for the final display of the characters (step 308).

Figure 4:
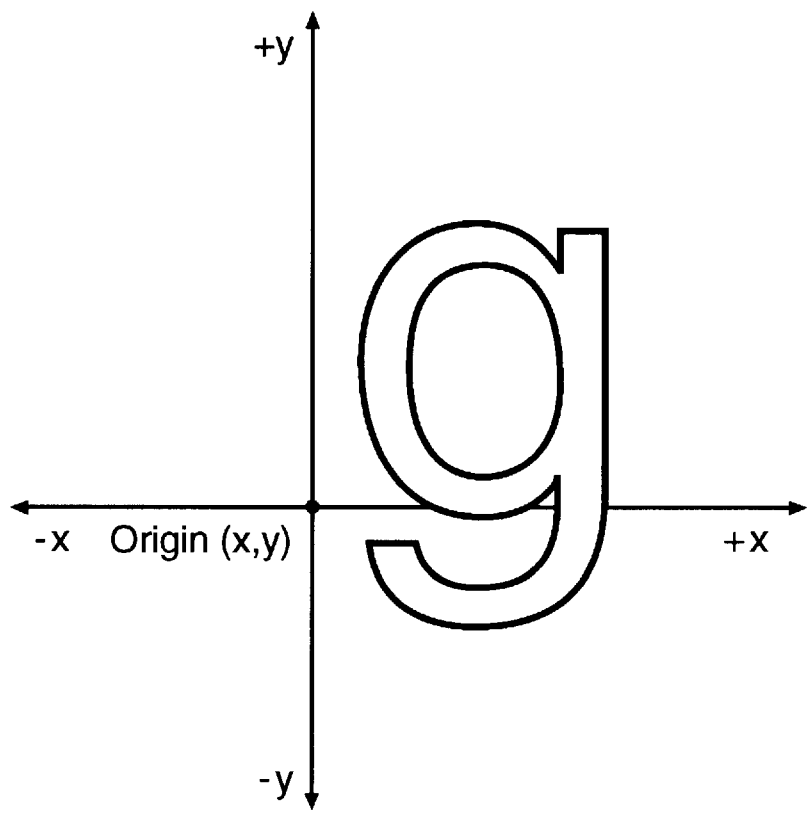
FIG. 4 depicts the character-space coordinate system used in the description of the invention.

For each character, the character outline is determined (steps 310–314); an exemplary coordinate system in which the outline may expressed for purposes of the invention is shown in FIG. 4. In a preferred embodiment, the invention utilizes Type 1 PostScript fonts, wherein the character outlines are represented by a series of Bézier control points that are transformed into Bézier cubic equations to represent the curved sections and line equations for the straight line segments. In this embodiment, the outlines are derived from the Adobe Type Manager Software (ATM) (see the Adobe Type Manager Software API: Macintosh, Technical Note #5072), from Adobe Systems, Inc. It should be stressed, however, that the invention may be used with virtually any outline format (e.g., the TRUETYPE font format developed by Apple Computer Corp., Cupertino, Calif., the OPENTYPE font format of Microsoft Corporation, Redmond, Wash., or the TYPE 3 font format developed by Adobe Systems, Inc.).

In step 310, the character outline information is retrieved from the Adobe Type Manager (ATM) software and stored in a data structure called a Linked List. The ATM returns character outline information as a series of control point sets. Each set represents a mathematical description of a portion of the character outline, and corresponds to one of four types of outline path descriptors: Move To; Line To; Curve To; and Close Path. As each name implies, the path descriptors define the different types of segments that make up the outline. Move To moves the current origin point. Line To defines a straight line segment. Curve To defines a Bézier-curved line segment. Close Path defines the end of an outline segment. When receiving character outline information from the ATM software, the invention makes a new Node (or data record) in the Linked List for each new set of control points that it receives. Each Node contains the type of outline path descriptor (Move To, Line To, Curve To, or Close Path) that the control points represent, and the x,y values associated with that set of control points.

Figure 5:
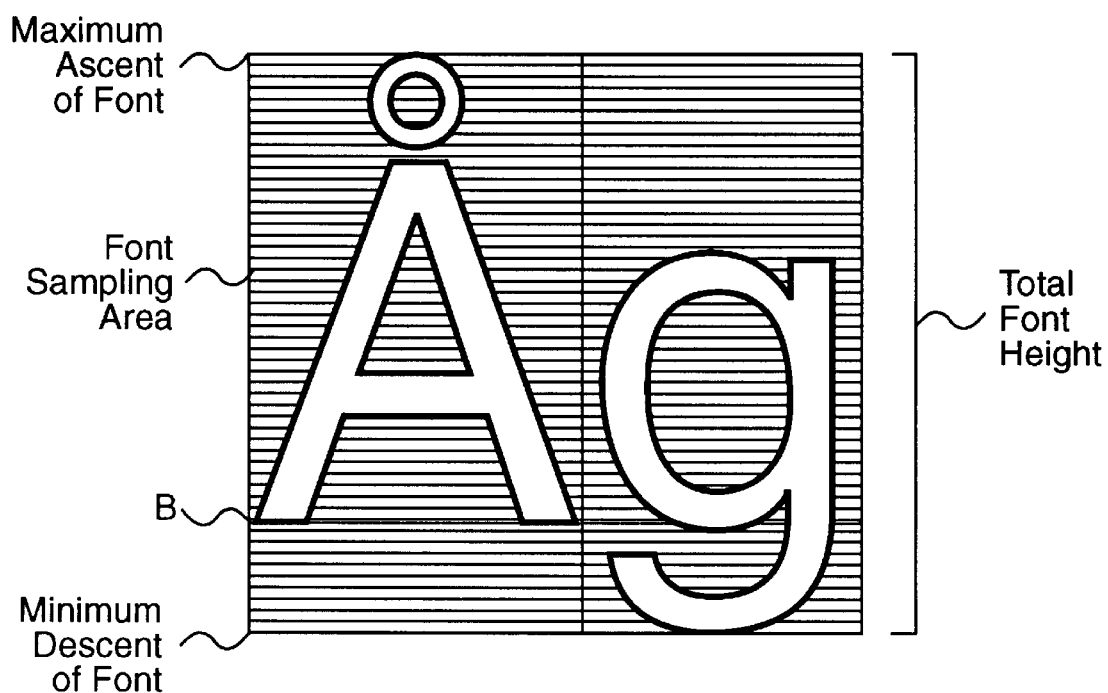
FIG. 5 illustrates the manner in which characters are sampled.

In accordance with step 314, the character outlines are sampled at various horizontal levels (or values). In a preferred embodiment, the character is sampled 100 times at equal vertical increments. This is shown conceptually in FIG. 5, where the spacing between scan levels has been increased for purposes of presentation. In the PostScript system, the FOND height is used to determine how tall the displayed font is (FOND height is described in Macintosh FOND Resources, Technical Note #0091, Abobe Developer Support). The FOND contains Ascent and Descent values: The maximum height above the baseline and depth below the baseline reached by characters in this font. These heights are used to set the y-value (horizontal level) distribution for sampling the character outlines.

The sampling procedure can be analogized to raster scanning, whereby an intercept x value is registered for each y value where a scan line intersects the character contour. In modern, computationally implemented systems, the character contour is not actually rendered, but is instead represented mathematically. Similarly, scan lines are not actually drawn; instead, the points of intersection for each sampling height are computed (i.e., for a given y value, the x value intercept is found). When sampling, and no x value is present at a given y value—that is, no intercepts are obtained at a given sampling height—the invention places a Minimum Flag or a Maximum Flag to indicate "no value." Before sampling is begun, the Maximum Flag Value (the largest coordinate of the display system with which the invention is used) is assigned to the x-minimum value, and the Minimum Flag Value (the smallest coordinate of the display system) is assigned to the x-maximum value; for example, in the QUICKDRAW display system (Apple Computer Corp.), the largest coordinate is 32,767.0 and the smallest coordinate is −32,768.0. During sampling, minimum and maximum x-values are established for each vertical scanning level, the minimum x-value corresponding to the first (leftmost) intercept of a scan level and the maximum x-value corresponding to the last (rightmost) intercept of the scan level; these values are stored in a Character Outline array (step 314), which is explained more fully below.

Figure 6:
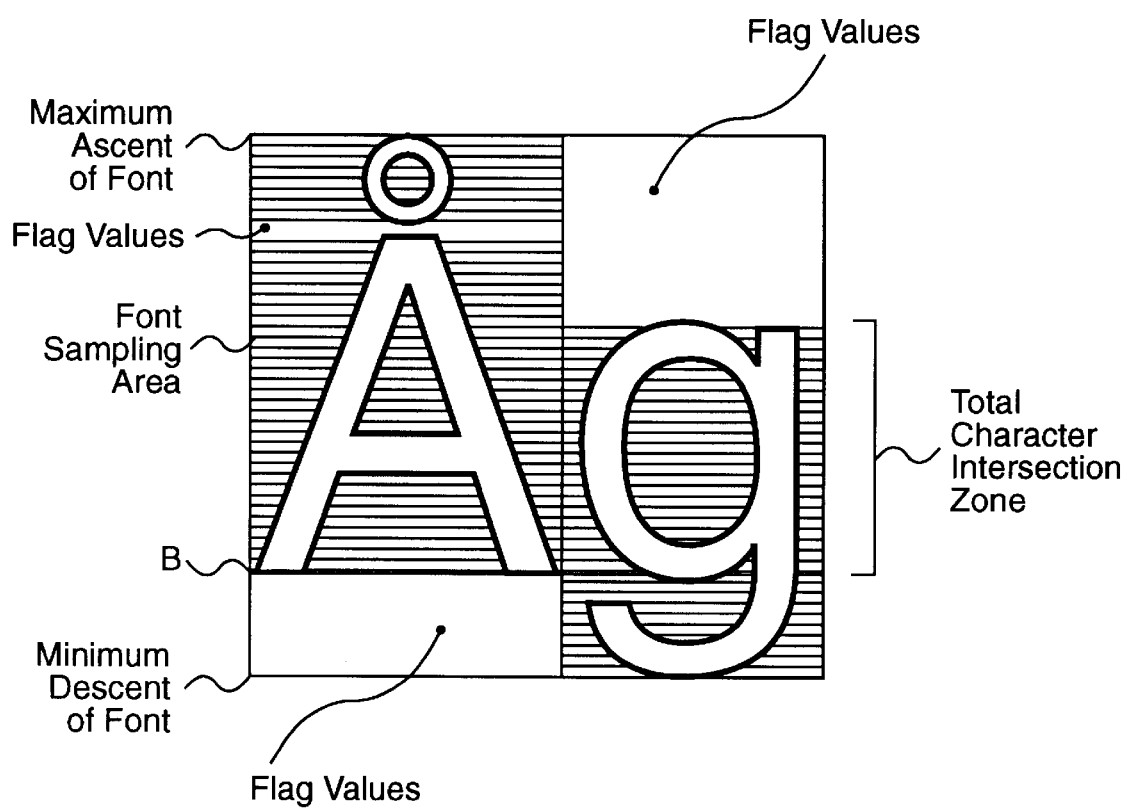
FIG. 6 shows how character intersections and flag values are assigned in the process of sampling.

In step 314, the invention evaluates the Linked List to find the x-value intercepts (for each side of the character) at each y value. As the invention evaluates each for an intercept, it discards any nodes for which the y value does not have an x value—that is, for which a true character intercept does not exist. As shown in FIG. 6, this is accomplished by evaluating the Bézier control point or line end-point y values against the sampling y value (that is, the scan height). If the current scan height y value is outside the range defined by the line or curve endpoints, the minimum x value retains the preset Maximum Flag value and the maximum x value retains the preset Minimum Flag value. If an intercept is within the vertical end-point range, an x-value is expected, and the Bézier or line equation is solved to find that value. Manipulating the standard line equation determines the x-value for a line, while Newtonian approximation techniques may be used to determine the Bézier curve x-value(s). Thus, evaluating the current scan height y value against all the character outline information stored as nodes in the Linked List, the invention saves the minimum and maximum x-values for the entire character outline at each y value in the Character Outline array—an array of data structures containing the sample height (y value), the minimum x value, the maximum x value, and the numbers of the Outline Nodes within which the intercepts occur. This procedure is ultimately performed on all characters of the entered string (steps 318–322).

In step 316, the character's width value—as defined by the font—is placed into the Character Displacement Array.

Figure 1:
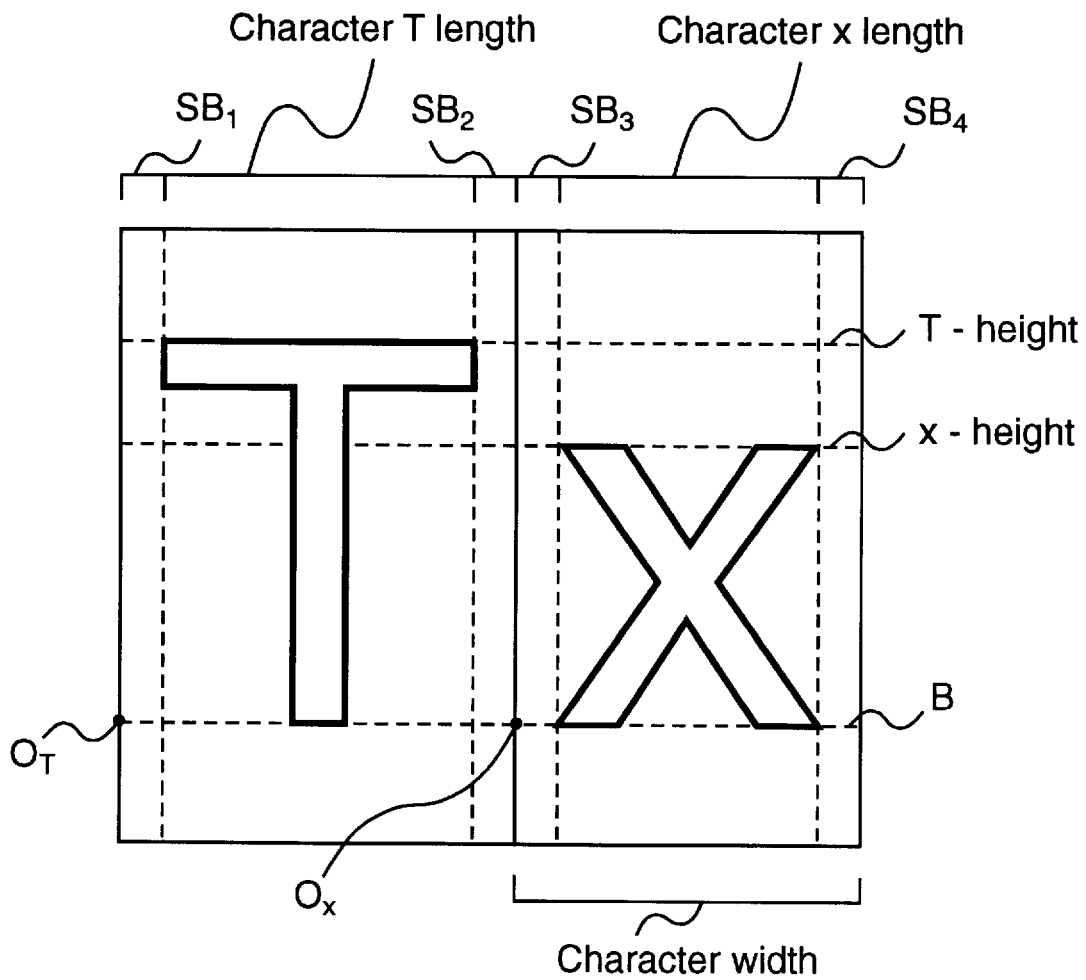
FIG. 1 graphically illustrates relevant aspects of rendered characters and their nomenclature.
Figure 7:
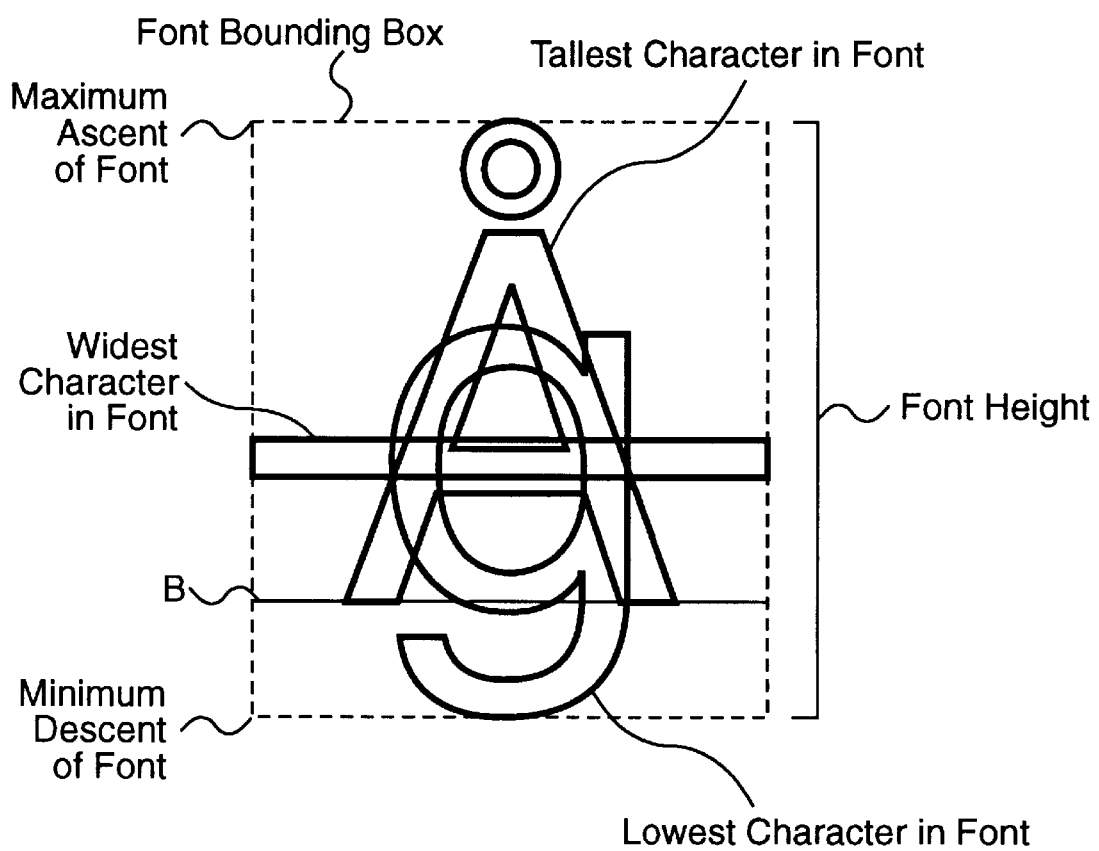
FIG. 7 shows how a font bounding box is defined based on maximum font height, depth and width.

The analysis performed by the invention may be bypassed by selecting a default character spacing (step 324), in which case the the characters are positioned as dictated by the default. Otherwise, the analysis begins by determination of the distance between adjacent characters at each vertical scan level, based on the currently applicable spacing style (step 326). First a check is performed to make sure that there are at least two characters in the character string. If there are, then the right side of the first character can be compared with the left side of the second character at each scan height. In step 328, the Character Widths (see FIG. 1) are scaled to the current font size. The Font Height (the distance from the lowest part of the font to the highest part of the font) is found for both characters (see FIG. 7); if the characters are different sizes, or of different fonts, then the larger of these two values is stored. A percentage of this height will be used as the Default Spacing Value. (In another embodiment, the Capital Height of the larger character is used as the default spacing value; in still another embodiment, these two values are averaged).

Figure 8:
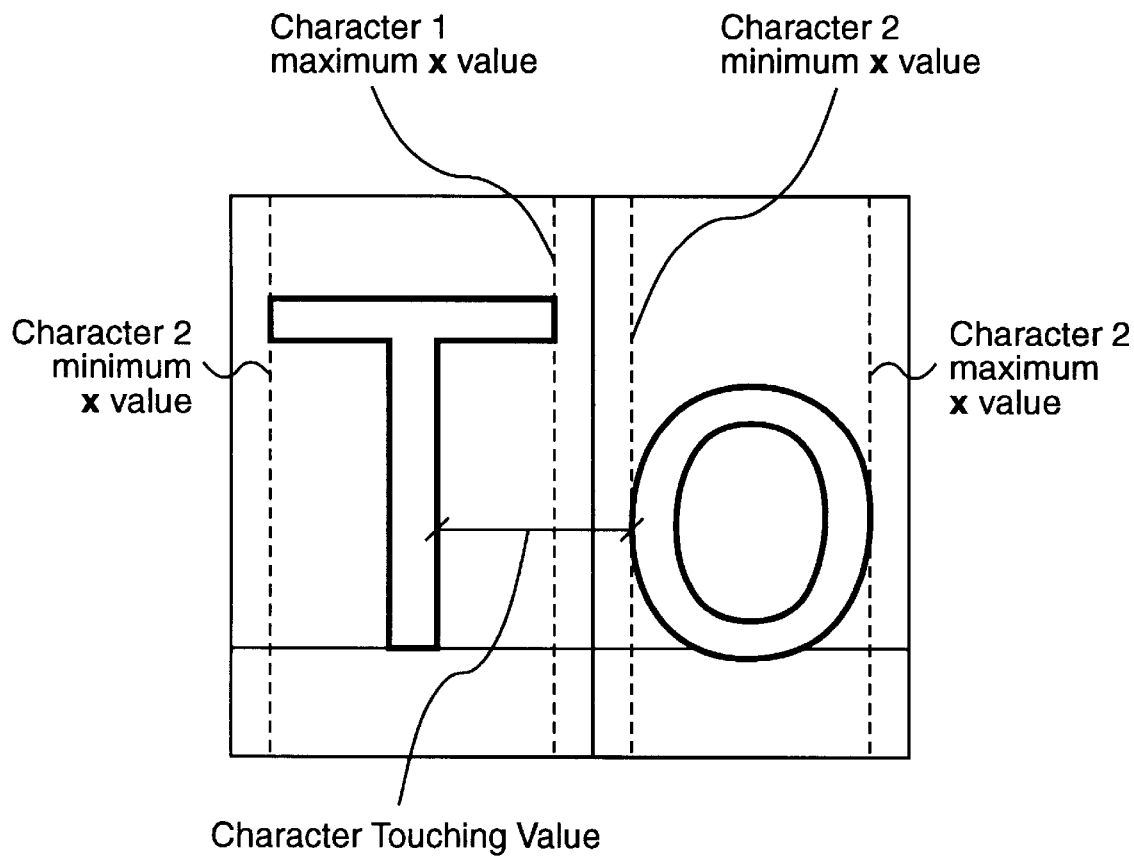
FIG. 8 illustrate various character parts used in the invention and their nomenclature.

In step 330, the Intercharacter Distance array is set up to hold the value difference between a left character ("Character 1") maximum value (rightmost intercept) and an adjacent right character ("Character 2") minimum value (leftmost intercept) for each pair of characters at each y-value scan height; this is best understood with reference to FIG. 8. If there is a Minimum Flag or Maximum Flag value for either character at a scan height, then a Maximum Flag value is placed in the array for that scan height. The outline data is now at the character's current size relative to 0,0 for each character's coordinate space, and is retrieved from the structures in the Character Outline array. If neither character has a flag value, then the Character Width value of Character 1 (i.e., the Character 1 maximum x value minus the Character 1 minimum x value plus sidebars, see FIG. 1) is added to the minimum x value of Character 2. Now the distance between this character pair at each scan level is specified with respect to the default font spacing (as defined in the font itself). The Character 1 maximum x value is then subtracted from this value, and the result is placed into the array. This process is repeated for all y values. In other words, the Intercharacter Distance array holds the space value (positive or negative) between the character pair for each y-value sample at the font's default spacing.

Figure 2A:
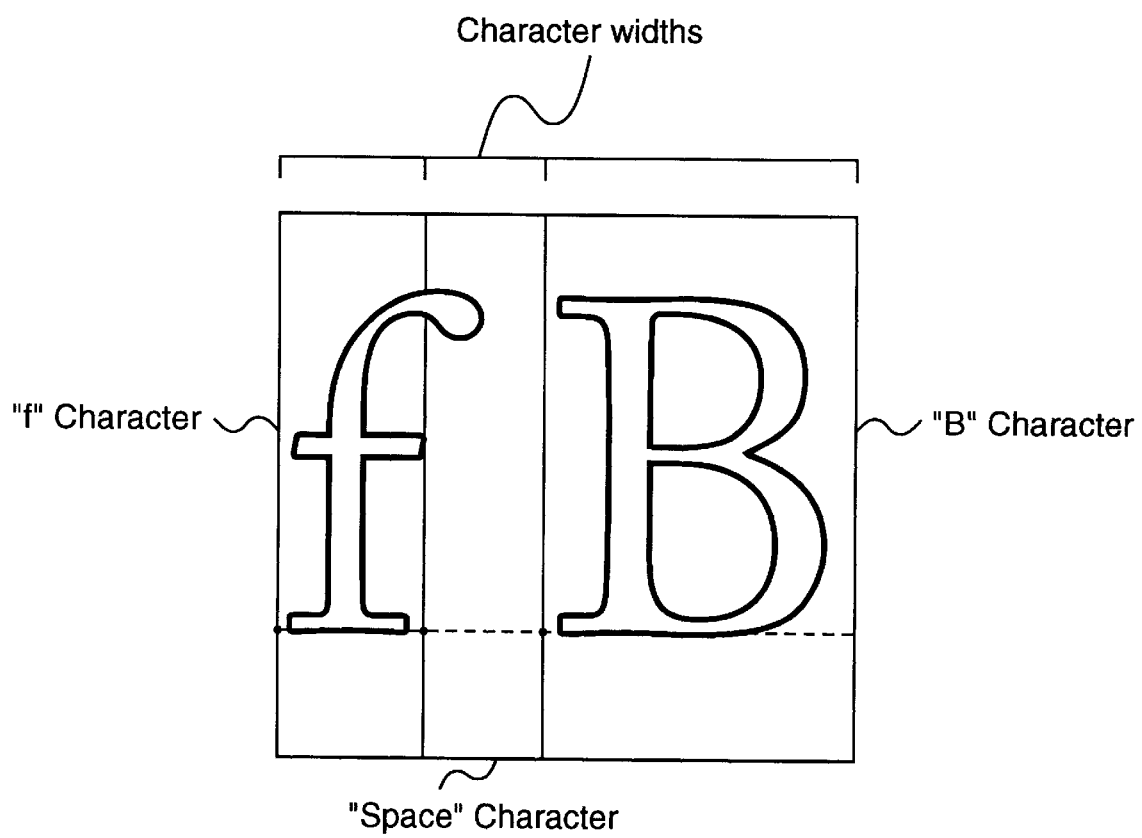
FIGS. 2A and 2B illustrate character bounding boxes and space-character alignment.
Figure 2B:
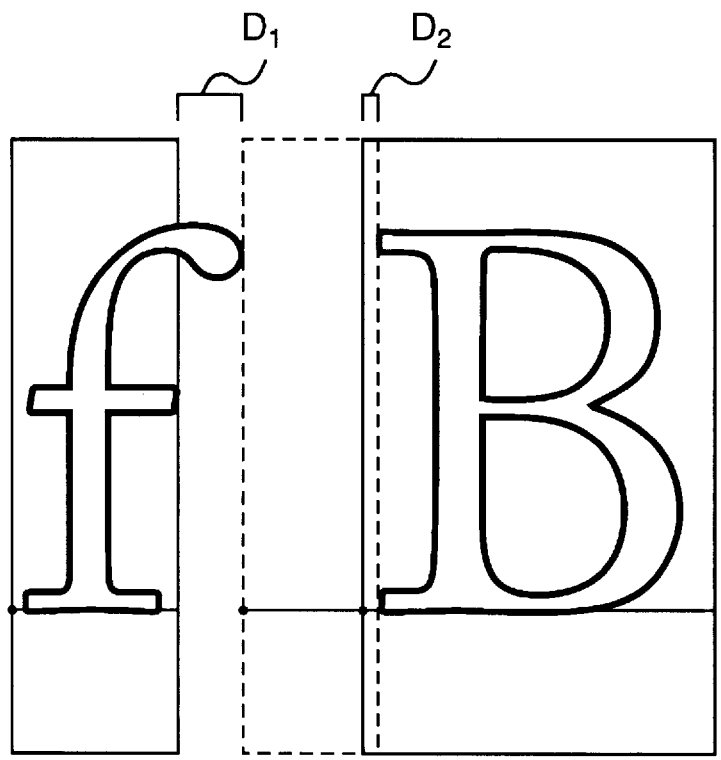
Figure 3A:
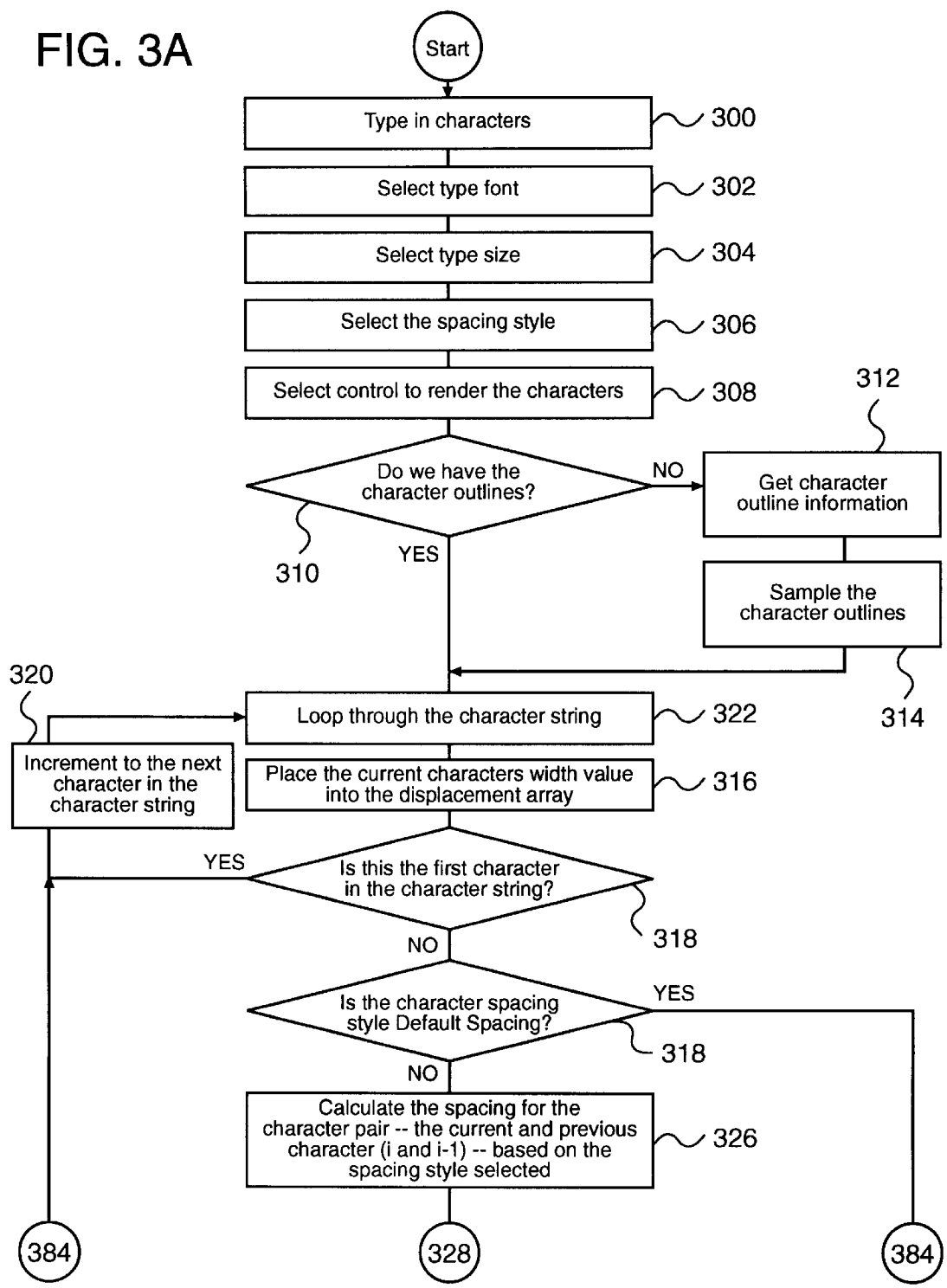
FIGS. 3A–3D illustrate, in flow-chart form, operation of the method of the invention.
Figure 3B:
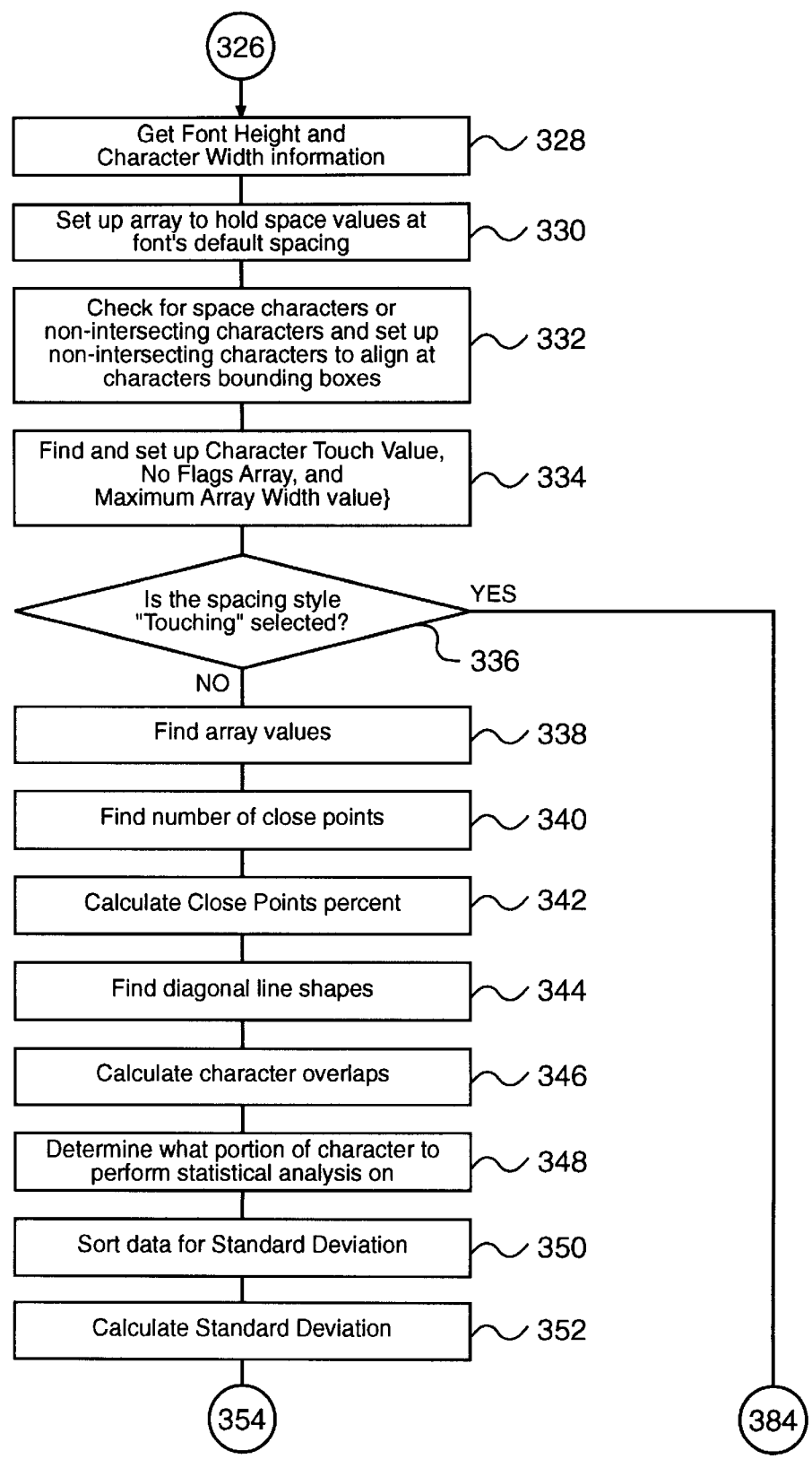
Figure 3C:
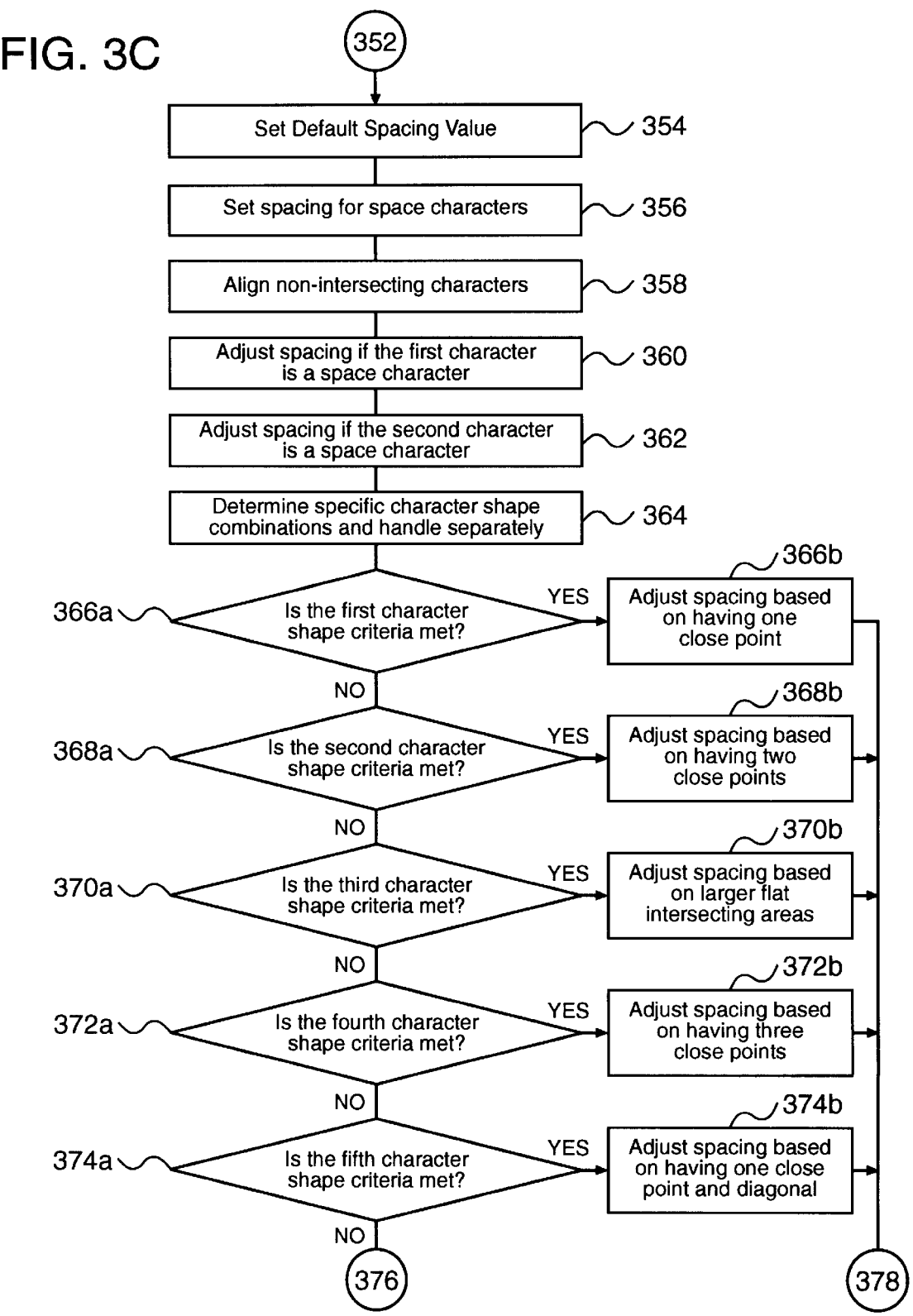
Figure 3D:
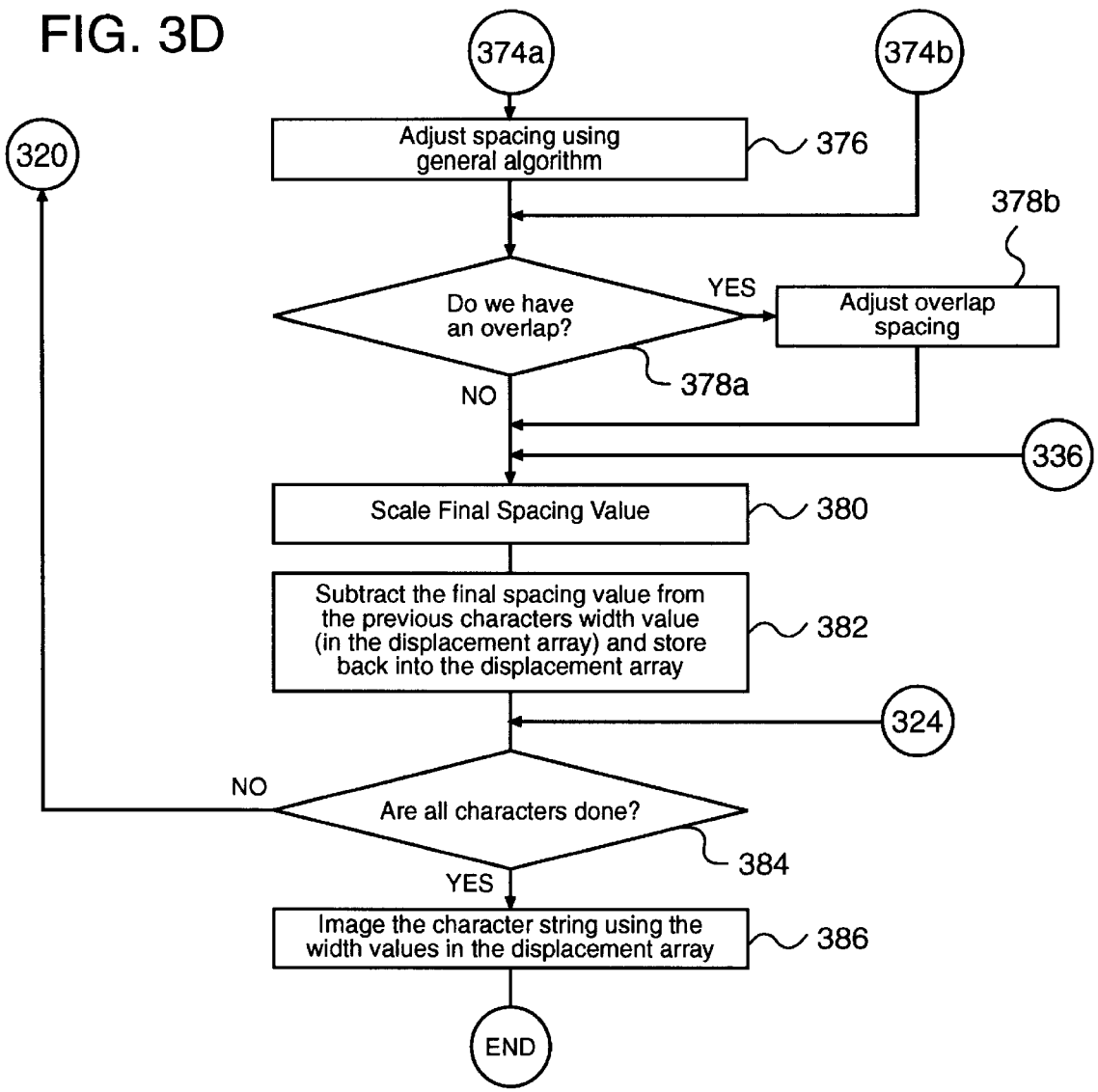
Figure 9:
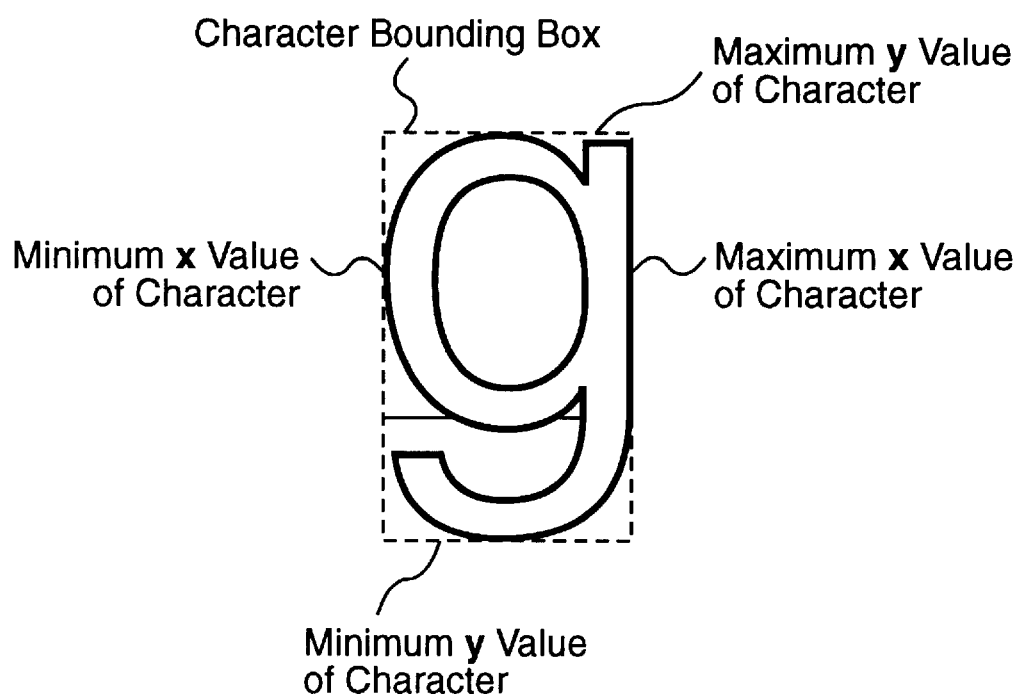
FIG. 9 shows a bounding box for a particular character.

Next, a series of checks is performed to determine if one or both of the characters is a non-printing space character (step 332). If a space character is encountered, the space character is positioned next to the Character Bounding Box of the other character (see FIGS. 2B and 9). (In another embodiment, intercharacter spacing is kerned even for combinations including a space.) If the Node Count (i.e., the total number of outline description coordinates or Nodes in the Linked List) for Character 2 is less than or equal to two, then Character 2 is a space character. The maximum x value of Character 1 is subtracted from the width of Character 1, and the result is placed in the first position of the Intercharacter Distance array; this value aligns the left edge of the space character to the Character Bounding Box of Character 1. A Space Character 2 Flag showing that Character 2 is a space character is initialized to True, or one.

If, on the other hand, the Node Count for Character 1 is less than or equal to two, then Character 1 is a space character. The minimum x value of Character 2 is subtracted from the width value of Character 1, and the result placed in the first position of the Intercharacter Distance array. A Space Character 1 Flag showing that Character 1 is a space character is initialized to True, or one.

If Character 1 and Character 2 are space characters, then the Node Count for Character 1 and the Node Count for Character 2 are both less than or equal to two. In this scenario the Maximum Flag value is placed in the first position of the Intercharacter Distance array (indicating that kerning is not to take place). A Both Space Characters Flag, showing that both are space characters, is initialized to True, or one.

Figure 10A:
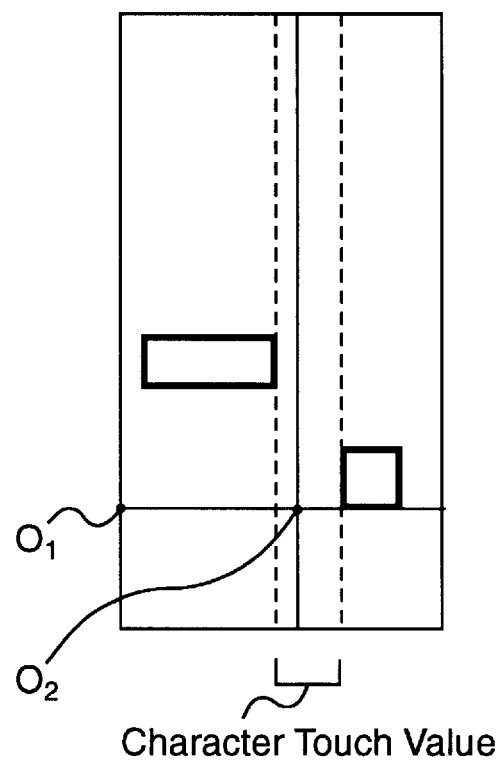
FIGS. 10A and 10B illustrate alignment of character bounding boxes.
Figure 10B:
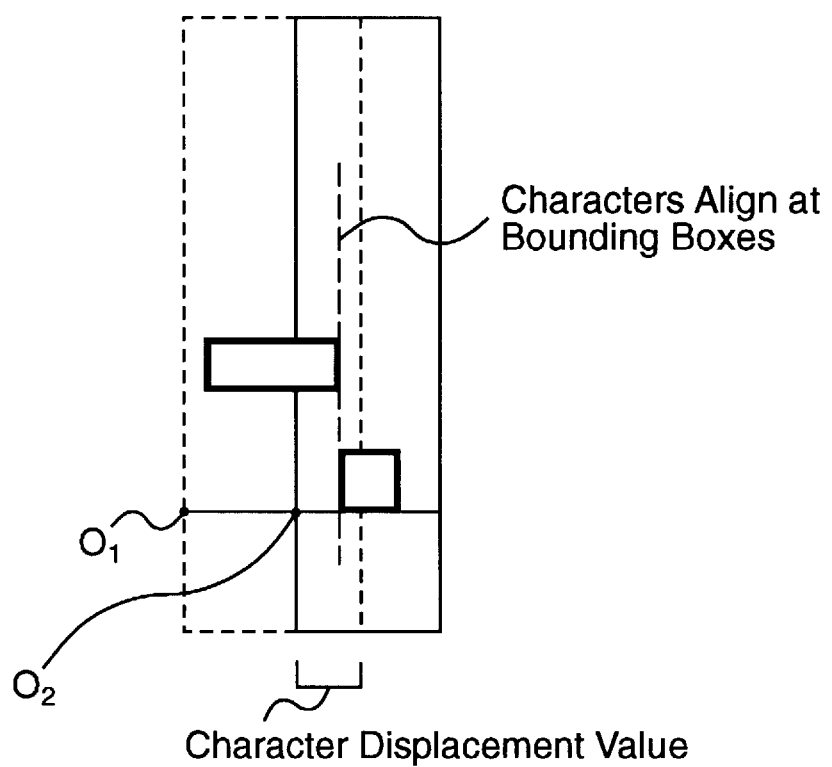
Figure 11A:
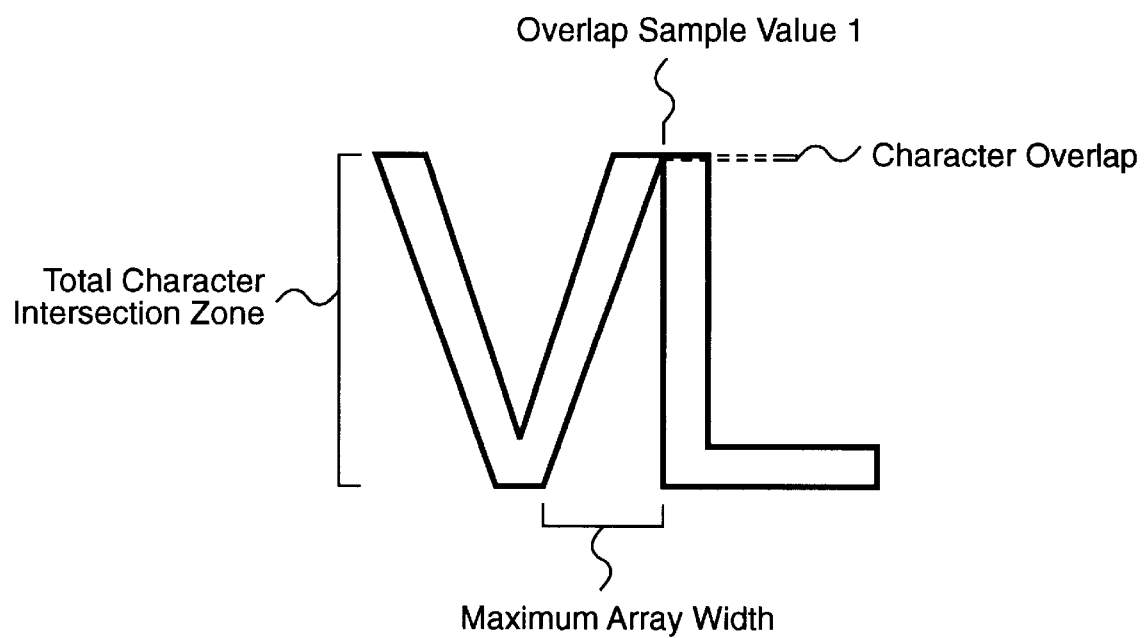
FIGS. 11A–11E illustrate a character pair and amounts of character overlap at varying degrees of superimposition.
Figure 11B:
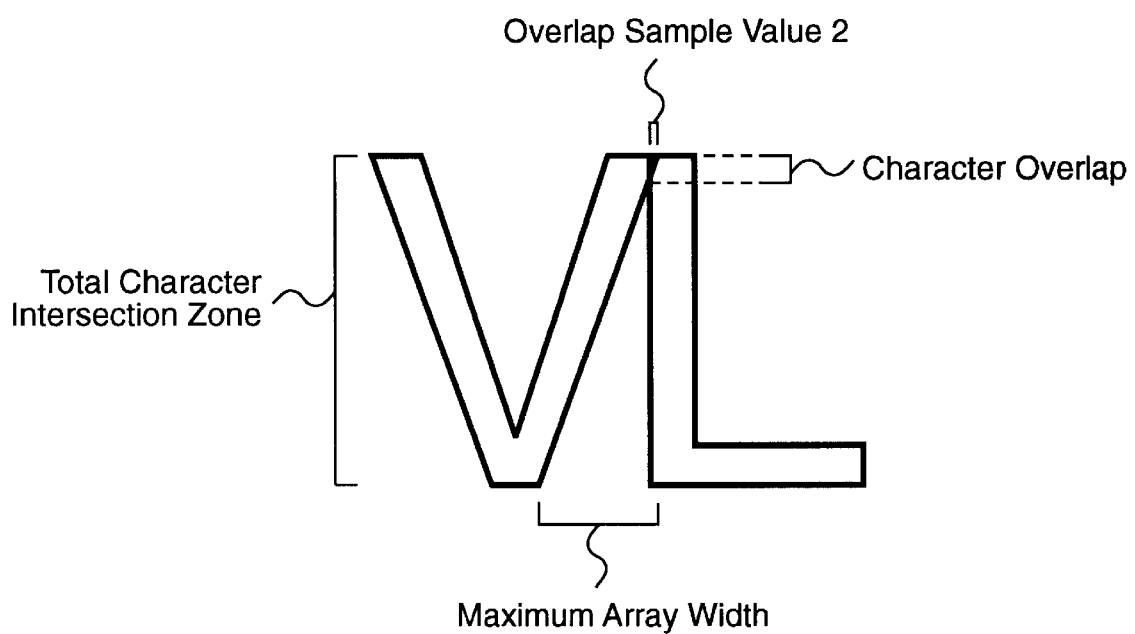
Figure 11C:
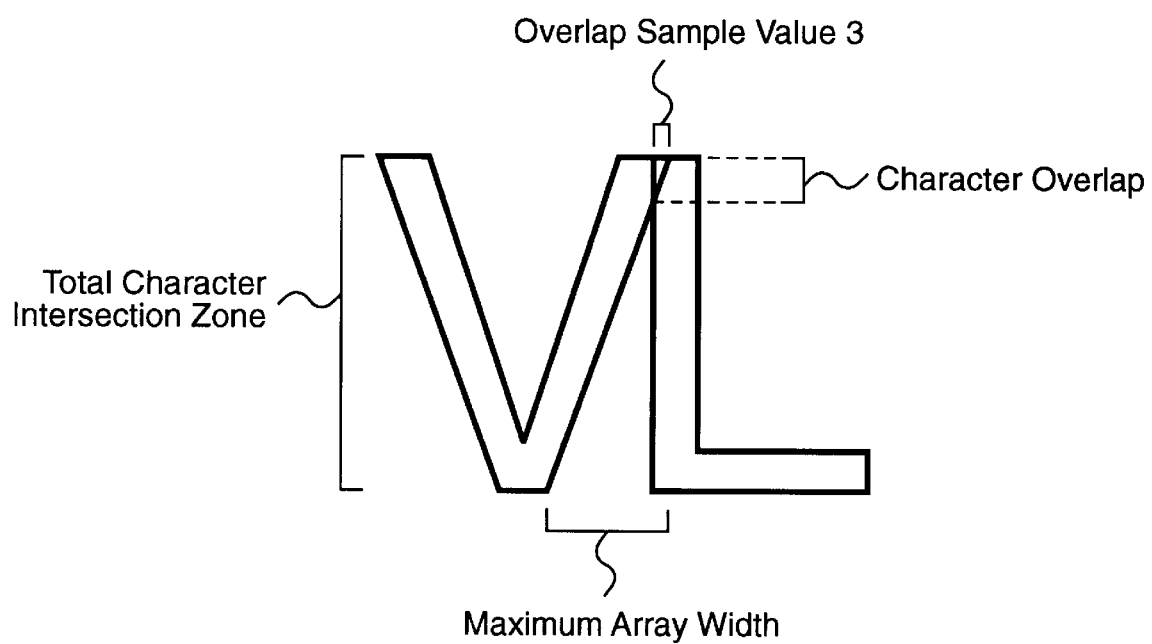
Figure 11D:
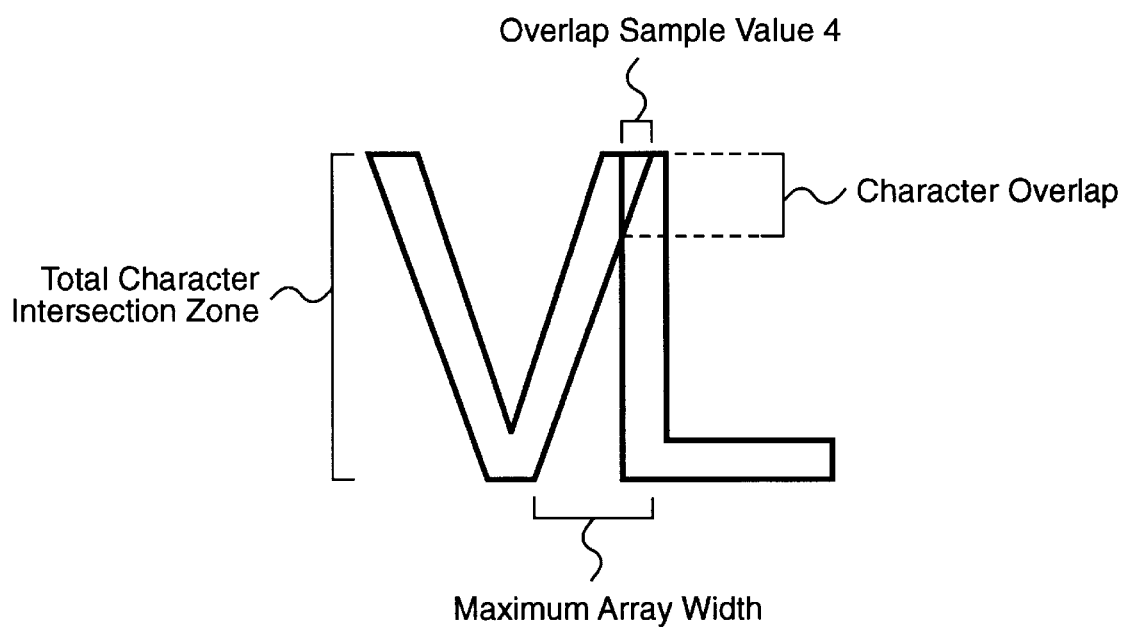
Figure 11E:
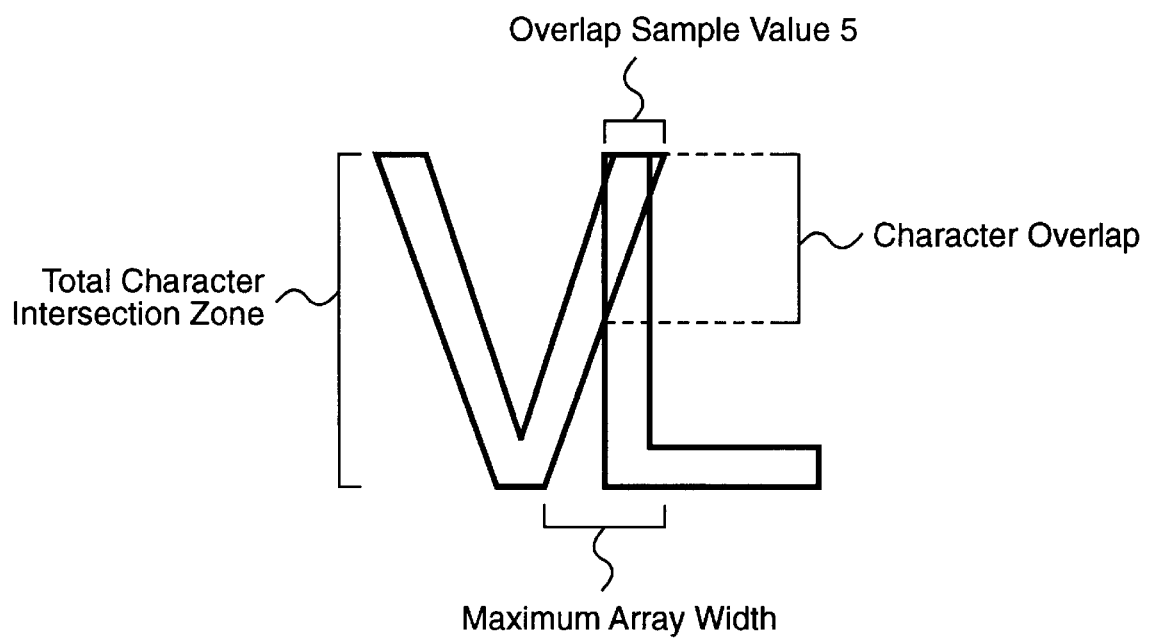

If none of the foregoing tests is true, then the two characters do not have any horizontally opposing outline for any given y-value sample. For these instances, the characters are adjusted to align at each character's Bounding Box (FIGS. 10A, 10B). The minimum x value of Character 2 is added to the width value of Character 1, and the maximum x value of Character 1 is then subtracted from the result. This value is placed into the first position of the Intercharacter Distance array. A No Intersection Flag showing that the characters do not intersect is initialized to True, or one.

In step 334, the smallest value in the Intercharacter Distance array is found. This is the value that, when subtracted from the character pair's default spacing, would make the characters just touch (see FIG. 8). This value is saved as the Character Touch Value. A new array—the Character Touch Array—is then set up to hold values corresponding to spacings that would make the characters just touch. These values, which are obtained by subtracting the smallest value in the Character Displacement array from all of the values in that array, are copied into another array, the No Flags Array, but without any Minimum or Maximum Flag Values included. All of the values are counted and saved as the Total Array Count. The largest value in this array is then found and stored for later use as the Maximum Array Width (i.e., the maximum width in any array). This value, if used to determine intercharacter spacing (i.e., when added to the Character Touch Value), would cause the characters to overlap completely. Thus, if the user selects a spacing style whereby adjacent characters are to touch (step 336), the Character Touch Values are used to determine intercharacter spacing.

In step 338, the No Flags Array is sorted in ascending order. The process then determines the fraction of values falling within 0 to 33% of the Maximum Array Width (the close values). Next, the process finds the fraction of values that fall within the remainder of the array (that is, the values greater than 33% and up to 100% of the largest value in the array—the far values). A close-points-to-far-points ratio of these numbers is calculated by dividing the close-value fraction by the far-value fraction; this result is stored as the Close-Far Ratio. If an array value is less than or equal to 1.5% (0.015) of the maximum width of the array, it is counted as if it were a zero or touching value, and any such values are saved as the Zero Values Zone Count. This count is stored for later use.

In step 340, the number of character extremities (close points) separated by wide spaces (open areas) in the array is calculated (e.g., "CL" returns 2, "EL" returns 3, etc.) and the value stored for later use as the Close Count. To accomplish this, the invention searches for gaps; a gap is defined as one or more Character Touch Array values smaller than a first fixed percentage (v %) of the Maximum Array Width, separated by one or more Character Touch Array values greater than a second fixed percentage (w %) of the Maximum Array Width. For example, v may be 15% (0.15) of the Maximum Array Width and w may be 85% (0.85) of the Maximum Array Width. In other words, the invention steps through the Character Touch Array to find values within v % of the maximum value separated by values at least w % of the maximum value. Two flags, a Gap Flag and a Close Flag, are initially set to true and to false, respectively. If an array value is less than the v value then the Close Flag is set to true. If the Gap Flag is also true, then the Close Count is incremented and the Gap Flag is set to false. If the data point is greater than w, and the Close Flag is set to true, then the Gap Flag is set to true and the Close Flag is set to false. The array is then incremented and the process repeated until the end of the sample set is reached. The Close Count is saved for future use.

In step 342, the percentage of the Close Points in the Character Touch Array is found by dividing the total number of points in the array that are less than 15% (0.15) of the Maximum Array Width by the total array count (excluding flags). This value is stored as the Close Percent for later use.

Each pair of characters is then analyzed to detect the presence of diagonal lines relative to one another, and to determine the type of line: upwardly sloping (inverted, closer to the next character at the top) or downwardly sloping (exverted, closer to the next character at the bottom). To accomplish this, successive values in the array are compared, beginning at the entry corresponding to the bottom of the adjacent characters. Each value is compared with the next value in the array (corresponding to higher points in the characters). If a successive value exceeds the previous value, the Exverted Diagonal Count is incremented; if a successive value is less than the previous value, the Inverted Diagonal Count is incremented. This process is repeated until the whole array has been stepped through.

Next, the percentage of diagonal line values is calculated. To do this, three flags are initially set to false: a Diagonal Line Flag; an Inverted Diagonal Line Flag; and an Exverted Diagonal Line Flag. If the Inverted Diagonal Count is larger than the Exverted Diagonal Count, then the Inverted Diagonal Flag is set to true, or one, and the Inverted Diagonal Count is assigned as the numerator that will be used to calculate the percentage of diagonal values. If the Exverted Diagonal Count is larger than the Inverted Diagonal Count then the Exverted Diagonal Flag is set to true, or one, and the Exverted Diagonal Count is assigned as the numerator that will be used to calculate the percentage of diagonal values. The numerator is divided by the the Total Array Count and the result is saved as the Diagonal Values Percent. If the diagonal values percent is greater than or equal to 85%, then the Diagonal Flag is set to true, or one. The percentage threshold value can be adjusted to filter serif characters from sans serif characters by increasing this value to 100%.

If the Diagonal Flag is false, then there is no diagonal and the Diagonal Check Value is set to zero. If the Inverted Diagonal Flag is true, or one, then there is an Inverted Diagonal present and the Diagonal Check Value is set to one. If the Exverted Diagonal Flag is true, or one, then there is an Exverted Diagonal present and the Diagonal Check Value is set to two. In an alternative embodiment, the actual outlines of the two characters are examined, and calculus is used to determine the character shapes that are actually present.

Figure 12A:
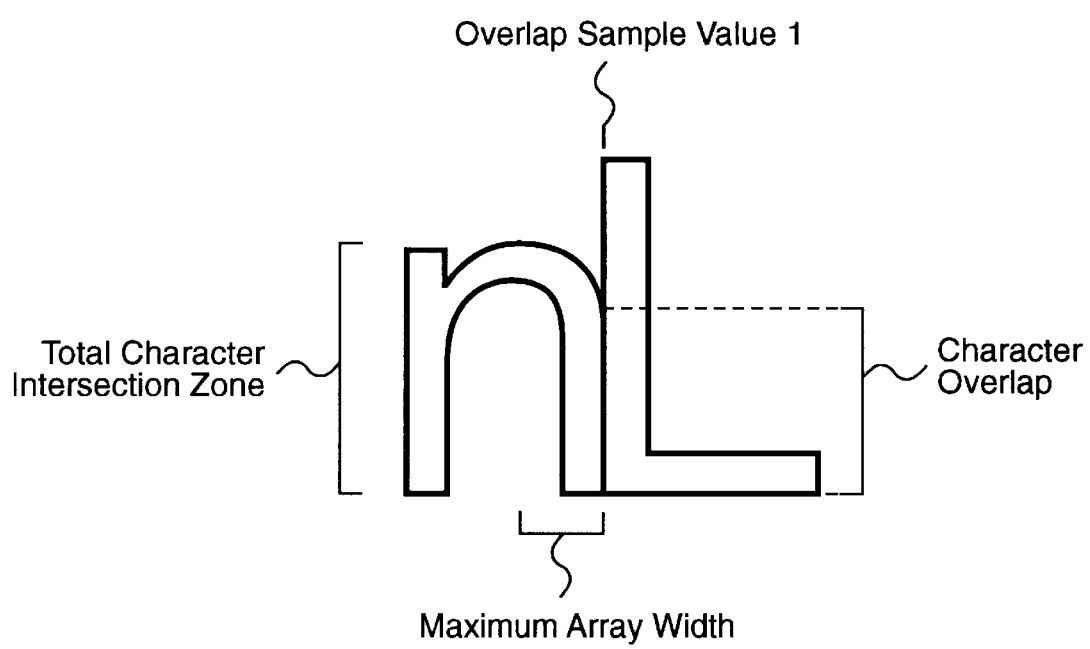
FIGS. 12A–12E illustrate another character pair and amounts of character overlap at varying degrees of superimposition.
Figure 12B:
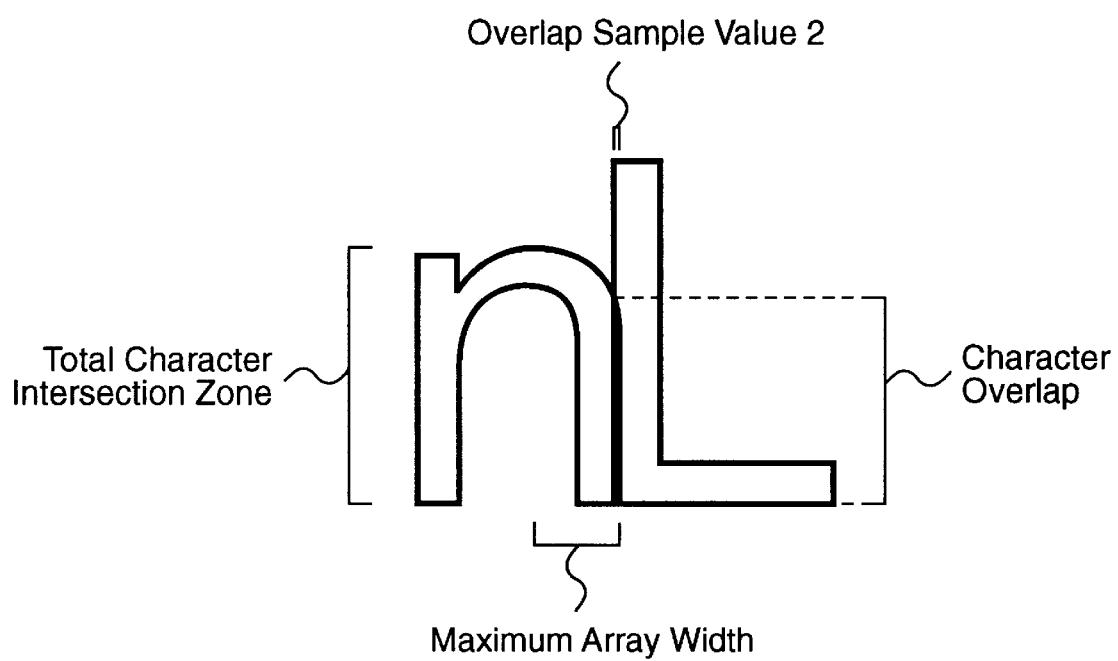
Figure 12C:
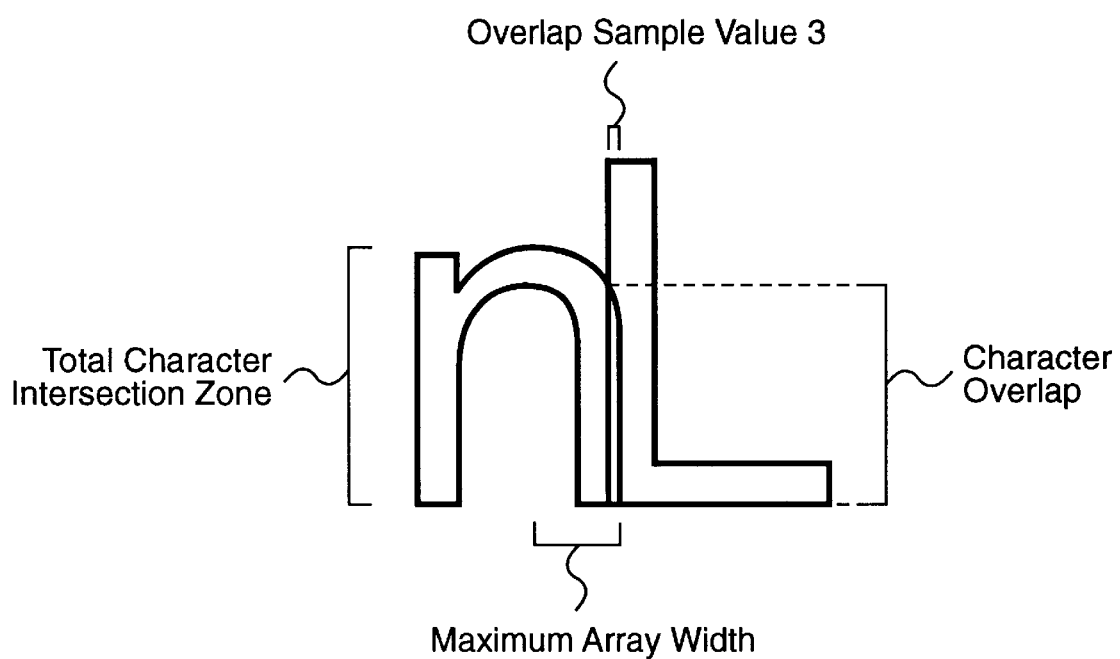
Figure 12D:
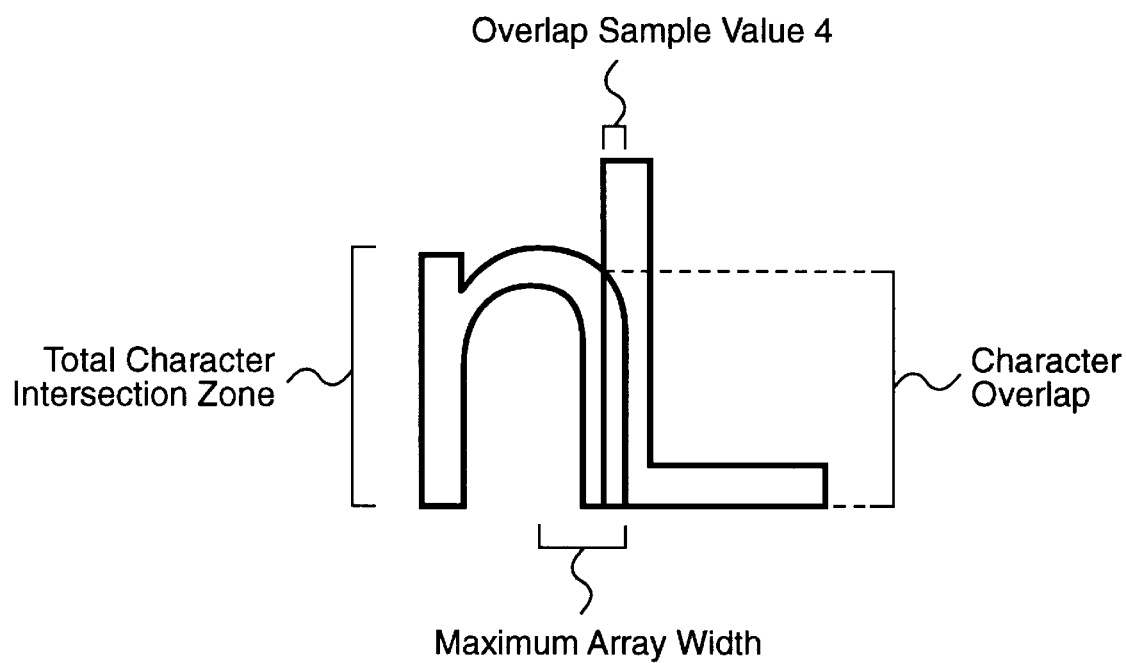
Figure 12E:
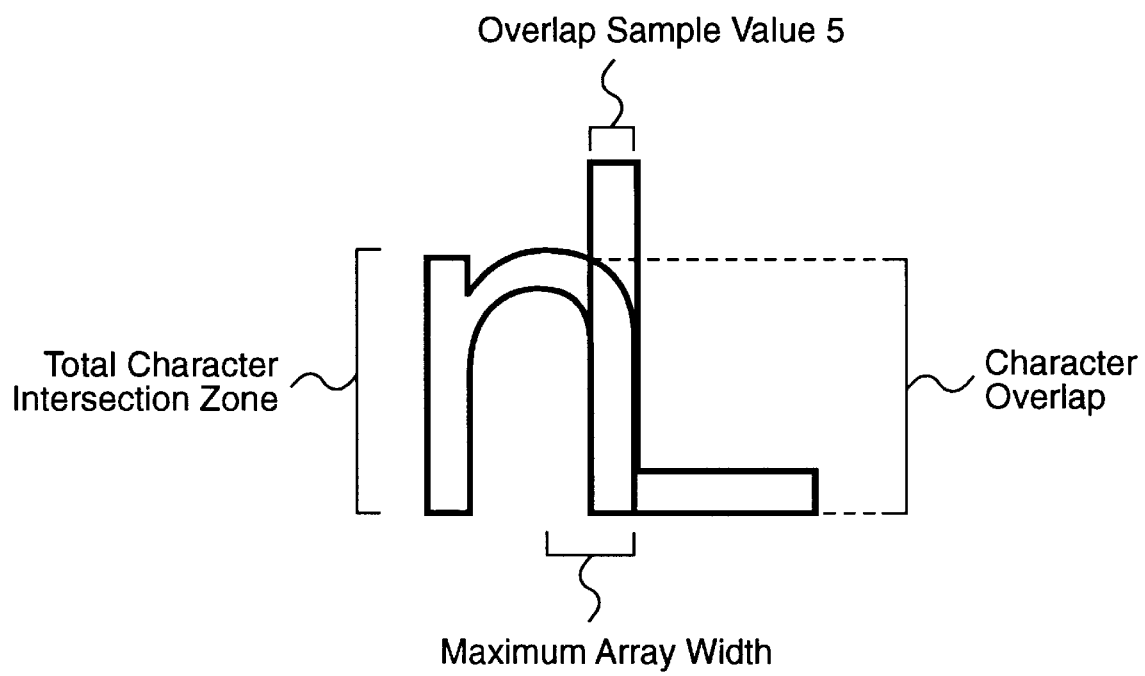
Figure 14:
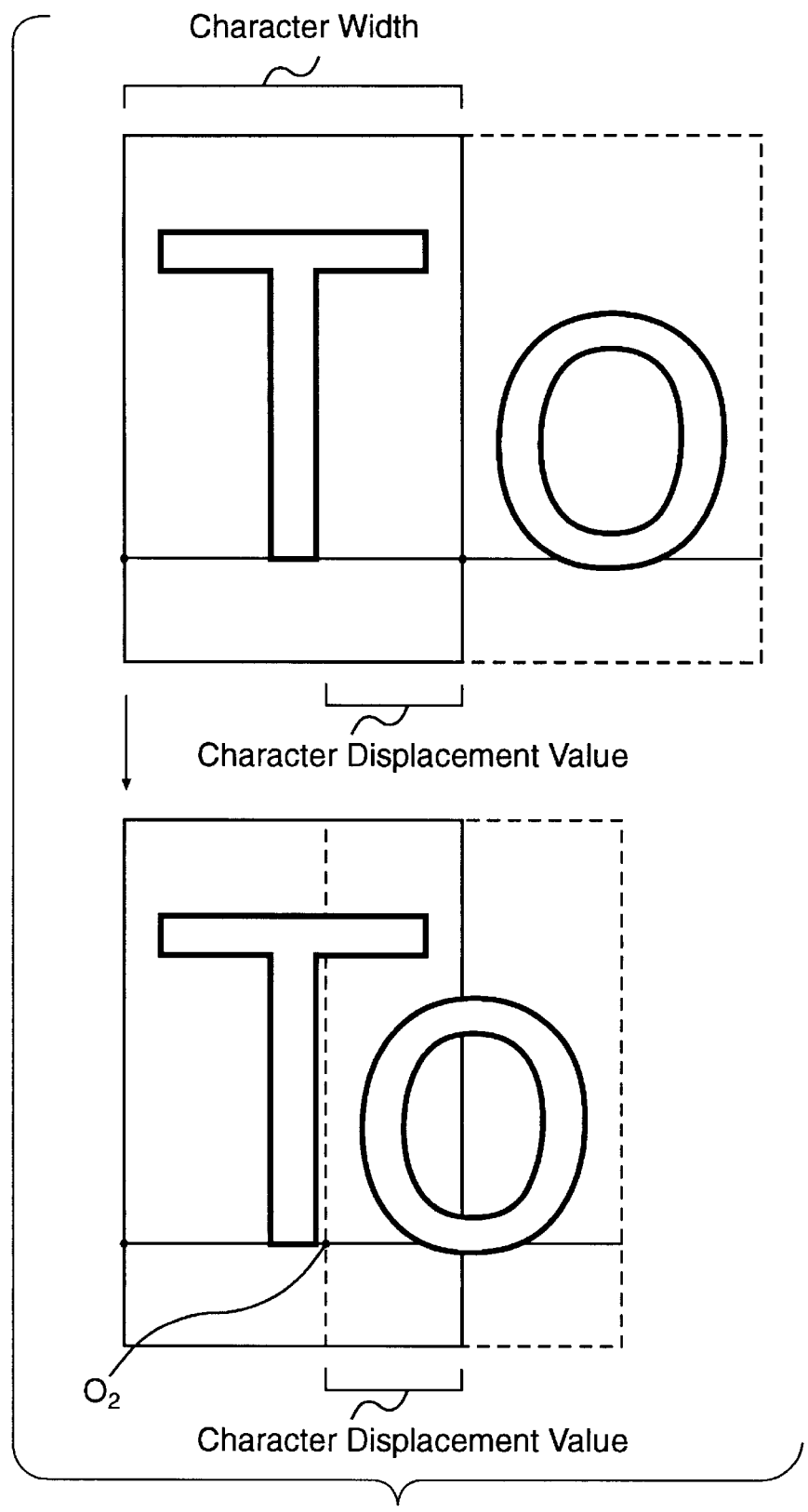
FIG. 14 illustrates the manner in which characters are kerned in accordance with the invention.

The invention next determines the percentage of actual character overlap between a character pair at five different degrees of superposition (step 346, illustrated in FIGS. 11A–11E). The Overlap Sample Values, specifying the degrees of superposition, are calculated as a percentage of the Maximum Array Width of the No Flags Array. In the preferred embodiment, the process uses the following values: 0 (Overlap Sample Value One, shown in FIGS. 11A and 12A); 1/16 or 0.0625 (Overlap Sample Value Two, shown in FIGS. 11B and 12B); 1/8 or 0.125 (Overlap Sample Value Three, shown in FIGS. 11C and 12C); 1/4 or 0.25 (Overlap Sample Value Four, shown in FIGS. 11D and 12D); and 1/2 or 0.5 (Overlap Sample Value Five, shown in FIGS. 11E and 12E) of the Maximum Array Width. The percent that the characters overlap at each superposition level is expressed as the percentage of the total (intersectable vertical) height at that level (i.e., when one of the characters is shifted from the point where it just touches the adjacent character by an amount equal to an Overlap Sample Value).

The procedure used is as follows. For each of the five overlap sample values, the process performs the following steps. First, the Maximum Array Width is multiplied by the Overlap Sample Value and this result is stored as the Overlap Sample Percent. The Overlap Sample Percent is subtracted from each No Flags Array value and the result placed into another array, the Overlap Array. If the new array value is less than or equal to zero, then it is counted as an overlap or Negative Count. This step is repeated for all values in the No Flags Array. To determine the percentage of overlap as a percentage of the intersecting character height, the Negative Count is divided by the Total Array Count (the number of entries in the No Flags Array) and the result is saved as the Overlap Percent.

Alternatively, the overlap sample percentages can instead be calculated by dividing the height of the intersection (labeled "Character Overlap" in FIGS. 11–12) by the total character intersection zone for each degree of character superimposition.

These overlap sample percentages are used to determine the portion of the array upon which to perform a statistical analysis in order to determine character spacing. As the percentage of intersection increases in relation to the maximum array width (i.e., as the overlap increases), the sample set for the statistical analysis is increased. The sample set is preferably determined by taking the average of three of the overlap percent values (for 1/16, 1/8, and 1/4 of the maximum width of the array) and subtracting the result from a user-defined filter variable. This user-defined filter variable can range between 0 and 1. A value of 0.78 has been found to work well with most typefaces. However, by changing the filter-variable value, the user may alter the spacing styles and the proportions of intercharacter spacing. For example, it may be useful to change the filter variable when changing from a font where all of the curves are perfect circles to one where the curved characters are more elliptical.

The resulting value is stored as the Filter Percent. This variable value becomes larger as the percentage of character overlap of characters increases. For example, as shown in FIGS. 11B–11E, the character pair "VL" exhibits substantially less overlap at successive Overlap Sample Values 2 through 5 than does the character pair "nL," as may be seen by comparison of FIGS. 11A–11E with FIGS. 12A–12E. Accordingly, the Filter Percent for the character pair VL would be less than the Filter Percent associated with nL.

It is the Filter Percent that is used to determine the proportion of the array upon which to perform a statistical analysis (step 348). A new array is created to contain only values which are less than or equal to the product of the Filter Percent and the maximum value in the array, the Maximum Array Width. The values placed in the new array are identified by stepping through the No Flags Array. For each value, a check is first performed to see if the maximum value in the array is equal to zero. If it is, then a Check Value is initialized to zero. If the maximum value in the array is not equal to zero, then the current value of the No Flags Array is divided by the maximum value and the result is assigned to the Check Value. Next, all of the values that fall below the Filter Percent in the array are stored in a new array. This is, of course, a variable set of data points determined by the value of the Filter Percent. If the Check Value is greater than or equal to zero and less than or equal to the Filter Percent, then the result is placed into the new array, the Accumulated Zone Array, and the count of values in the Accumulated Zone Array is incremented and stored as the Accumulated Zone Count. This process is repeated until all of the values in the No Flags Array have been checked.

It is possible, for the sake of convenience at the cost of potential accuracy loss, to fill the Accumulated Zone Array with values no greater than 33% of the maximum array width (instead of calculating a Filter Percent and using this to determine the contents of the Accumulated Zone Array). This procedure can also be used in routines described below that make use of a Filter Percent.

At the same time, it is also possible to vary the computation of the Filter Percent (e.g., to provide for greater flexibility). For example, the percentages of the Maximum Array Width represented by each Overlap Sample Value can be altered, either to different fixed values or variably (e.g., according to a user-set sliding scale). Similarly, the number of overlap samples analyzed can also be varied, as can the weights accorded to each sample value. For example, weighted combinations of different overlap zones can account for larger areas of space between characters, or be used to produce different character spacing styles. The Filter Percent can also be derived based on the rate of change of a character's curved outline segment.

Preferably, the statistical analysis performed on the contents of the Accumulated Zone Array is a standard deviation $$S = \sqrt{\frac{n\Sigma u^2 - (\Sigma u)^2}{n(n-1)}},$$

where each u denotes a value from the Accumulated Zone Array and n is the total number of such values (i.e., the size of the array). The result S of the standard deviation calculation (steps 350, 352) is stored as the Variable Standard Deviation.

In step 354, the default (unkerned) intercharacter spacing amount is set. Although this value may be provided by the user, it is preferably calculated with reference to a user-selected percentage of the total font height. This percentage (the Font Height Percent) can range from 0 to 100% of the total font height, although values of 5–20% are preferred; 10% is a versatile percentage applicable to a variety of typefaces. Reducing the Font Height Percent produces tighter spacing, while increasing it produces looser spacing. The Default Spacing Value is calculated by multiplying the Font Height by the Font Height Percent by the Font Size.

Alternatively, the default intercharacter spacing can be determined using the height-to-width ratio of the font. This may be the ratio of height to width in the capital "H" character (or an average of a number of specific characters in the font), and a percentage of this ratio is used as the Default Spacing Value. Using this approach, the height-to-width ratio would add more space to condensed (tall and thin) fonts, where additional space is needed between characters to increase type legibility. Fonts with a height-to-width ratio close to 1 would receive less spacing, and extended fonts (wider than tall), with a height-to-width ratio less than 1, would receive the least spacing.

In other alternative embodiments, the basis for the Default Spacing Value is a percentage of the character's (or font's) vertical stem width, or the slope of a line segment in a character.

Now the actual character pair spacing is adjusted. The first characters that are compared and for which spacing is adjusted are those combinations that include one or two Space Characters, or those that contain character combinations that would not intersect horizontally (e.g., a dash character next to a period character "–.") (step 356). If the Character Touch Value is equal to the Maximum Flag value, then both characters being sampled are space characters. In this case, the default width values of the space characters are used for spacing.

Non-intersecting characters are aligned in step 358. If the No Intersection Flag is equal to true, or one, then the Character Touch Value is used as the distance between the origin of the first character and the origin of the second character. This aligns non-intersecting characters at their Bounding Boxes or extreme edges (see FIGS. 10A, 10B).

If the Space Character 1 Flag is equal to true, or one, then the Character Touch Value is used as the distance between the origin of the first character, the space character, and the origin of the second character (step 360). This aligns the leftmost point of the second character to the right edge of the (first) space character's width (see FIG. 2B).

If the Space Character 2 Flag is equal to true, or one, then the Character Touch Value is used as the distance between the origin of the first character and the origin of the second (space) character (step 362). This aligns the rightmost edge of the first character with the left edge of the space character's width, or origin point (see FIG. 2B).

Beginning at step 364, a series of checks are performed to determine specific character shape combinations and then these different situations are handled by separate spacing procedures. The following steps represent a series of checks that are performed before setting the Final Spacing Value. If any of the checks do not meet the test criteria, the rest of the routine associated with the step is skipped, the Final Spacing Value is not set, and the Kerning Complete Flag (initially set to false, or zero) is not set to true, or one. The next routine is then considered.

The first character shape combination is characterized by having only one close point—such as a "TL" character combination—where the characters intersect. The first check examines the number of close points stored as the Close Count value. If this value is one (step 366a), further and more specific checks (denoted generally at 366b) are performed. The next check determines whether the overlap area is predominately flat by checking if the Overlap Sample Value One has a value greater than 2% (0.02). This essentially checks for sans serif character combinations. The next check determines whether their are no diagonal lines present by checking if the Diagonal Check Value is equal t6 zero. Then the Close-Far Ratio is checked to see if the value is greater than or equal to 1% (0.01). This will filter out two straight parallel characters (e.g., two lower case Helvetica L's). The next check determines whether the Maximum Array Width is greater than or equal to the Default Spacing Value. This will filter out small spurs on characters (e.g., "ul" Frutiger Light) that are otherwise parallel. If these checks are all true, then a Zero Values Percent is set. This is calculated by dividing the Zero Values Zone Count—the count of values that are less than 1.5% (0.015) of the width of the No Flags Array—by the Total Array Count. The result is compared to a Minimum Base Value, which has a default value of 40% (0.40) that may be altered, if desired, by the user. If the result of division is less than the Minimum Base Value, then the Minimum Base Value is used for the Zero Values Percent (this value ranges between 1.0 and the Minimum Base Value). The Zero Values Percent is then multiplied by the Default Spacing Value, thus reducing the Default Spacing Value. The Variable Standard Deviation, calculated earlier, is then subtracted from this result. This number is then subtracted from the Character Touch Value and the result stored as the Final Spacing Value. A Kerning Complete Flag is then set to true, or one.

If the characters intersect at two close points (e.g., a capital "CL" character combination), then the condition denoted at 368a is true, and the following routines, indicated generally at 368b, are performed. If the Kerning Complete Flag is not equal to true (or one), then these routines are initiated. If any of the checks do not meet the test criteria, the rest of the routines are skipped. The first check (step 368a) determines whether the number of close points, or Close Count, is equal to two. If so, then the next check determines whether the height of the character intersections is within a specified percent of the Capital Height of the character pair (a value of ±10 percent determines whether the characters are capitals). The next check determines whether there are no diagonal shapes present by seeing if the Diagonal Check Value is equal to zero.

If all of the above checks are true, then the following method is used to determine character spacing. Two overlap sample percentages are used to determine the portion of the array upon which to perform a statistical analysis to determine character spacing. As the percentage of intersection increases in relation to the maximum array width, and the overlap increases, the sample set for the standard deviation or statistical analysis also increases. In this case the Filter Percent (i.e., the value used to determine what portion of the array to statistically analyze) is determined by taking the average of two overlap percent values (preferably for $\frac{1}{16}$ and $\frac{1}{8}$ of the maximum width of the array, i.e., Overlap Sample Percent Two and Overlap Sample Percent Three), and subtracting the result from a user-defined variable that can range between 0 and 1 plus the average of the two overlap percent values, but which has a default value of 0.78. The resulting value is stored as the Filter Percent. This value is a variable value that becomes larger as the overlap percentage increases. A statistical variable, preferably the standard deviation, is calculated as described previously, using the newly defined Filter Percent value. This second standard deviation is distinct from the first (although it is calculated similarly), and is stored as the Two Close Points Standard Deviation. This value is then subtracted from the Default Spacing Value. The result is then subtracted from the Character Touch Value and that result stored as the Final Spacing Value. A Kerning Complete Flag is then set to true, or one.

The next routine looks at intersections of larger flat areas of the character pair and spaces them with the Default Spacing Value, or with a sliding-scale value. This ensures that character combinations such as a lower-case, sans serif "ni" combination will be equivalent to those of a lower-case, sans serif "II". If the Character Touch Value is not equal to true (or one), the criteria for this routine are met (step 370a) and the checks indicated generally at 370b are initiated. If any of the checks do not meet the test criteria, the rest of this routine is skipped. First the Total Array Count is multiplied by 0.66 (⅔) to obtain the Two Thirds Value, which is then stored. If the Zero Values Zone Count is greater than or equal to the Two Thirds Value the Default Spacing Value is subtracted from the Character Touch Value. This result is stored as the Final Spacing Value. A Kerning Complete Flag is then set to true, or one. Alternatively, it is possible to use a sliding scale and a variable zone between the One Half Value and Two Thirds Value of the Zero Values Zone Count. When the Zero Values Zone Count falls below the One Half Value (50%), the Variable Standard Deviation is preferably used as the spacing value. When the Zero Values Zone Count is greater than or equal to the Two Thirds Value, only the Default Spacing Value is used.

If the Zero Values Zone Count is greater than 0.66, then the Variable Standard Deviation is multiplied by zero. If the Zero Values Zone Count is less than 0.50, then the Variable Standard Deviation is multiplied by one. In between, a sliding scale is used. The sliding-scale spacing value used between the Two Thirds Value and the One-Half Value is calculated as follows. First, the Zero Values Percent is calculated by dividing the Zero Values Zone Count by the Total Array Count. Next, the Two Thirds Percent value is calculated by multiplying the Total Array Count by 0.66. Then the Half Count Percent is calculated by multiplying the Total Array Count by 0.50. If the Zero Values Percent is less than 0.66 and greater than 0.50, then the Variable Zone Value is calculated by subtracting the Half Count Percent from the Two Thirds Percent. This value is then multiplied by a constant value of 6.25, i.e., the value required to equal one (1.0) when multiplied by the Two Thirds Value (0.66). This result, the Standard Deviation Reduction Value is multiplied by the Variable Standard Deviation and the result saved as the Reduced Standard Deviation Value. This value is then subtracted from the Default Spacing Value, and the difference subtracted from the Character Touch Value. That result, in turn, is stored as the Final Spacing Value. A Kerning Complete Flag is then set to true, or one.

If the character pair has three close points, such as the capital "EL" character pair combination, then the condition indicated at 372a is true, and the steps indicated generally at 372b are initiated. Condition 372a is identified when the Character Touch Value is not equal to true (or one). Furthermore, if any of the checks do not meet the test criteria, the rest of this routine is skipped. The first check determines whether the Close Count (number of close points) is equal to three. Next, the Close Percent, or the percentage of points in the array that are less than 15% (0.15) of the maximum array value are calculated. Two-thirds of this value is added to the Minimum Base Value. If the result is less than one, the result is multiplied by the Default Spacing Value. If the result is greater than one, the Default Spacing Value is used without modification. The modified or unmodified Default Spacing Value is subtracted from the Character Touch Value, and that result stored as the Final Spacing Value. A Kerning Complete Flag is then set to true, or one.

If the character pair has one close point and an Exverted Diagonal (as is the case, for example, with a capital "LA" character pair combination), the condition denoted at 374a is true, and the ensuing steps, indicated generally at 374b, are performed. If the Character Touch Value is not equal to true (or one), this routine is initiated. Furthermore, if any of the following checks do not meet the test criteria, the rest of this routine is skipped. The first check determines whether the Close Count (i.e., the number of close points) is equal to one. Next, the Diagonal Check Value is checked to see if an Exverted Diagonal is present, a value of two indicating such presence. The number of consecutive overlaps that are equal to one another is then determined, and the value stored as the Compare Intersections Value. This is accomplished by stepping through the five Overlap Sample Values (Overlap Sample Value One, Overlap Sample Value Two, Overlap Sample Value Three, Overlap Sample Value Four, Overlap Sample Value Five), and comparing the current value to the succeeding value (i.e., compare 1 to 2, 2 to 3, etc.). Each time two values are found to be equal, the Compare Intersections Value, initially set to zero, is incremented by one. If the final Compare Intersections Value is greater than or equal to one, then the smaller of the two equal intersections is found, and a number corresponding to that Overlap Sample Value (1–5) is saved. The corresponding Overlap Sample Value is then used to set the Filter Percent. As described previously, the Standard Deviation is calculated with the Filter Percent used to determine what percentage of the array to sample. The Standard Deviation calculation is saved as the Standard Deviation Subset. Next, the Default Spacing Value is multiplied by the Overlap Sample Value Two (or 0.0625). The result is added to the Standard Deviation Subset value, and the sum subtracted from the Character Touch Value. The resulting difference is stored as the Final Spacing Value. A Kerning Complete Flag is then set to true, or one. If the Final Spacing Value is greater than the Character Touch Value, then an Overlap Flag is set to true, or one.

If the Character Touch Value is not equal to true (equal to one)—that is, if none of the conditions 366a, 368a, 370a, 372a or 374a are true—then the general algorithm for the Standard Deviation is used to set the character spacing (step 376). This is the routine that is used for most lower-case character-pair combinations. The Variable Standard Deviation, calculated previously, is subtracted from the Default Spacing Value, and the difference subtracted from the Character Touch Value. This result is stored as the Final Spacing Value, and a kerning Complete Flag is then set to true, or one.

The final spacing routine (indicated at 378a, 378b) selectively checks for values that would produce an overlap condition between characters, and recalculates the character spacing in these instances. If any of the checks do not meet the test criteria, the rest of this routine is skipped and the previously set Final Spacing Value to adjust the spacing for the character pair. The first check determines whether the Final Spacing Value is not equal to the Maximum Flag value, and the Overlap Flag is not equal to true, or one. The next check determines whether the Default Spacing Value minus the Variable Standard Deviation value is less than zero, and that the Final Spacing Value is greater than the Character Touch Value. The final check determines whether the Close Count is equal to one or equal to two. Then the Filter Percent is set to the Overlap Sample Percent Two. As described previously, the Standard Deviation is calculated with the Filter Percent used to determine the percentage of the array to sample. The Standard Deviation calculation is saved as the Standard Deviation Subset. The Overlap Sample Percent Two is then added to the Overlap Sample Percent Three, and the result multiplied by the Default Spacing Value. This product is added to the Standard Deviation Subset value, and the sum subtracted from the Character Touch Value. The resulting difference is saved as the Final Spacing Value. A Kerning Complete Flag is then set to true, or one.

The final, scaled character spacing is determined in step 380. The Default Spacing Value is typically the largest space used between character pairs. By subtracting a positive Default Spacing Value (or other calculated positive value) from the Character Touch Value, space is added between the character pair. By subtracting a negative Default Spacing Value (or other calculated negative value) from the Character Touch Value, space is removed between the character pair, and portions of the characters are made to overlap one another. The Final Spacing Value is subtracted from the width of the previous width to determine the Character Displacement, or the origin value of the second character.

The Final Spacing Value is divided by the point size of Character 2 to scale it down relative to the size of a one point font. For situations involving two adjacent characters of different font sizes, the characters are sampled in pairs, and the larger font height of the pair used to determine the y-value distributions along the height of the two characters.

Typically, a Displacement Array is used to hold the spacing values for all of the characters in the character string (see, e.g., Adobe Type Manager Software API: Macintosh, Technical Note #5072, Page 15, section 3.4, Displacement Array). The number of elements in the array is twice the number of characters being imaged, reflecting both horizontal and any vertical offsets (so that characters can be rendered anywhere). The displacement array, therefore, is a series of x and y widths for the characters being imaged in the character array. It is possible to have different widths used for a given character code that appears more than once in the character array. This allows for both track kerning and pairwise kerning, as well as special effects. It should be stressed that, although the foregoing discussion assumed left-to-right (horizontal) character adjacency, the invention is amenable to computing intercharacter spacing along any arbitrary axis along which characters are adjacently placed.

In step 382, the character string is stepped through from beginning to end. First the Displacement Array is populated with the Character Width value of the character, scaled to a size of one point. These character widths are the default spacing values defined in the font itself, and dictate the appearance of successive characters without kerning—that is, if default spacing were selected (see FIG. 12).

The foregoing procedures are repeated (step 384) until all characters have been analyzed and intercharacter spacings determined.

Rendering of a Character 1-Character 2 pair (step 386) is illustrated in FIG. 13. The Final Spacing Value is first subtracted from the Character 1 ("T") Character Width value. This new value, or Character Displacement, is used as the offset value between Character 1 ("T") and Character 2 ("o"), representing the origin of Character 2 and the location for the character to be displayed or imaged. The Character Displacement value is the distance between the Character 1 origin and the Character 2 origin $O_2$. If the Final Spacing Value is a positive value, then Character 2 is displaced to the left, or closer to Character 1. If the Final Spacing Value is a negative value, then Character 2 is displaced to the right, or farther from Character 1. The Character Displacement value is placed in the Displacement Array in the first position (for the second character in the string). The rest of the character string is then evaluated and this process repeated until the Displacement Array is filled with all of the values for the character string. The character string may then be imaged or displayed at the coordinate values dictated by the Displacement Array. The values are scaled to the appropriate size, and the characters are imaged at that size and in those positions. For example, after kerning in accordance with the invention, the default-spaced character string shown in FIG. 13 appears as depicted in FIG. 15.

The foregoing embodiment (and described alternatives), while preferred, is representative in nature, and numerous modifications within the scope and spirit of the invention are possible. It is possible, for example, to perform a coarse version of the foregoing analysis, omitting some of the computations and analyses of character pairings, as follows. Instead of filling the Accumulated Zone Array with values determined using the Filter Percent, the sampled data from the No Flags Array is analyzed to identify values representing the first 33% of where the two characters would intersect were they drawn gradually together (capturing all values that fall between 0% and 33% of the maximum array length). The standard deviation of these values is computed, and the result subtracted from the Default Spacing Value. This difference is subtracted from the Character Touch Value, and the result stored as the Final Spacing Value for the character pair. A Kerning Complete Flag is then set to true, or one.

In another alternative, the Default Spacing Value is not used at all. Instead, the standard deviation is subtracted from the Character Touch Value (adding space between the characters), and the result saved as the Final Spacing Value.

In yet another alternative, the Close-Far ratio is checked to handle larger open spaces between characters. If the ratio is greater than zero and less than one, then the standard deviation is calculated for values that are equal to or less than one-third of the maximum array length of the No Flags array; this quantity is then multiplied by the Close-Far Ratio. The result is added to: one minus the Close-Far Ratio, plus 0.10, multiplied by the standard deviation calculated for all the rest of the values in the array (e.g., those greater than one-third of the maximum value). This result is subtracted from the Default Spacing Value, and the difference subtracted from the Character Touch Value. The result is stored as the Final Spacing Value.

It is also unnecessary to use the standard deviation as the statistical benchmark for determining intercharacter spacing. Instead, statistical measures such as the mean, the first quartile, the third quartile or others can instead be used separately or in combination (with one another or with the standard deviation) in the manner set forth above with respect to standard deviation. The essence of this aspect of the invention is not a particular statistical relationship, but the use of statistical tools to analyze pairwise combinations of characters in order to determine an optimal spacing value.

The overall spacing results of the invention can be modified at a gross level (e.g., by global increase or reduction) or at the level of individual steps to accommodate different fonts or user preferences. For example, the rules can be varied to allow for different character spacing styles (e.g., tight not touching; very tight, some touching; etc.). It is also possible to provide the user with "sliding controls"—i.e., graphic representations of slide switches that can be manipulated using a mouse (or other position-sensing device), the instantaneous position of which dictates (in a linear, logarithmic or other fashion) some value related to spacing. For example, a slider can be provided to allow for control of the Character Displacement value such that space is reduced or increased in proportion to Character Displacement value (e.g., if CD1=5 and CD2=10, setting a slide switch to cause a 50% reduction would bring CD1 to 2.5 and CD2 to 5).

Spacing can also be adjusted based on the ratio of the total height of the larger character to the intersection height of the smaller character; for example, a 1:1 ratio might specify the unmodified Default Spacing Value, while a 10:1 ratio decreases the Default Spacing Value used for the particular character pair.

It is possible to determine spacing based on the percentage of character overlap in relationship to (e.g., as a percentage of) another value, such as the character's serif width, the character's height, or a fraction of the intersection height. In this manner, allowable character overlaps can be set based on a userdefined function of the character height, vertical and/or horizontal stem width, capital height, em space, or serif length.

The manner in which characters are sampled can also be varied. For example, characters can be compared three at a time to check for overlapping characters (e.g., "T.T" (two capital T's separated by a period)). Characters can be sampled separately, before they are combined into an array. For example, character shapes can be evaluated to identify specific shape parts, such as serifs. This allows for compensation of such shapes during the spacing process (e.g., identify a serif, measure its length, measure its height, and use a percentage of the serif's length to reduce the spacing when it aligns with another serif). Interior portions of characters can be sampled and saved, and the full character shape used to compute spacing.

Sampling can be dispensed with entirely, with character shapes determined using calculus, or the the y values (heights) of the maximum x-value of Character 1 and the minimum x-value of Character 2 determined mathematically. Also using calculus, the rate of change of a character's curved outline segment—or the slope of a straight-line segment—can be used as the basis for spacing determination.

It is also possible to use optical alignment in the spacing process. For example, optical alignment at the edges of columns can be achieved through statistical analysis, or using the intersection between a single character and a straight line or any other shape (instead of the intersections between two characters). The resulting overlaps can be used, for example, to determine the portion of the No Flags Array upon which to perform a statistical analysis.

Figure 16:
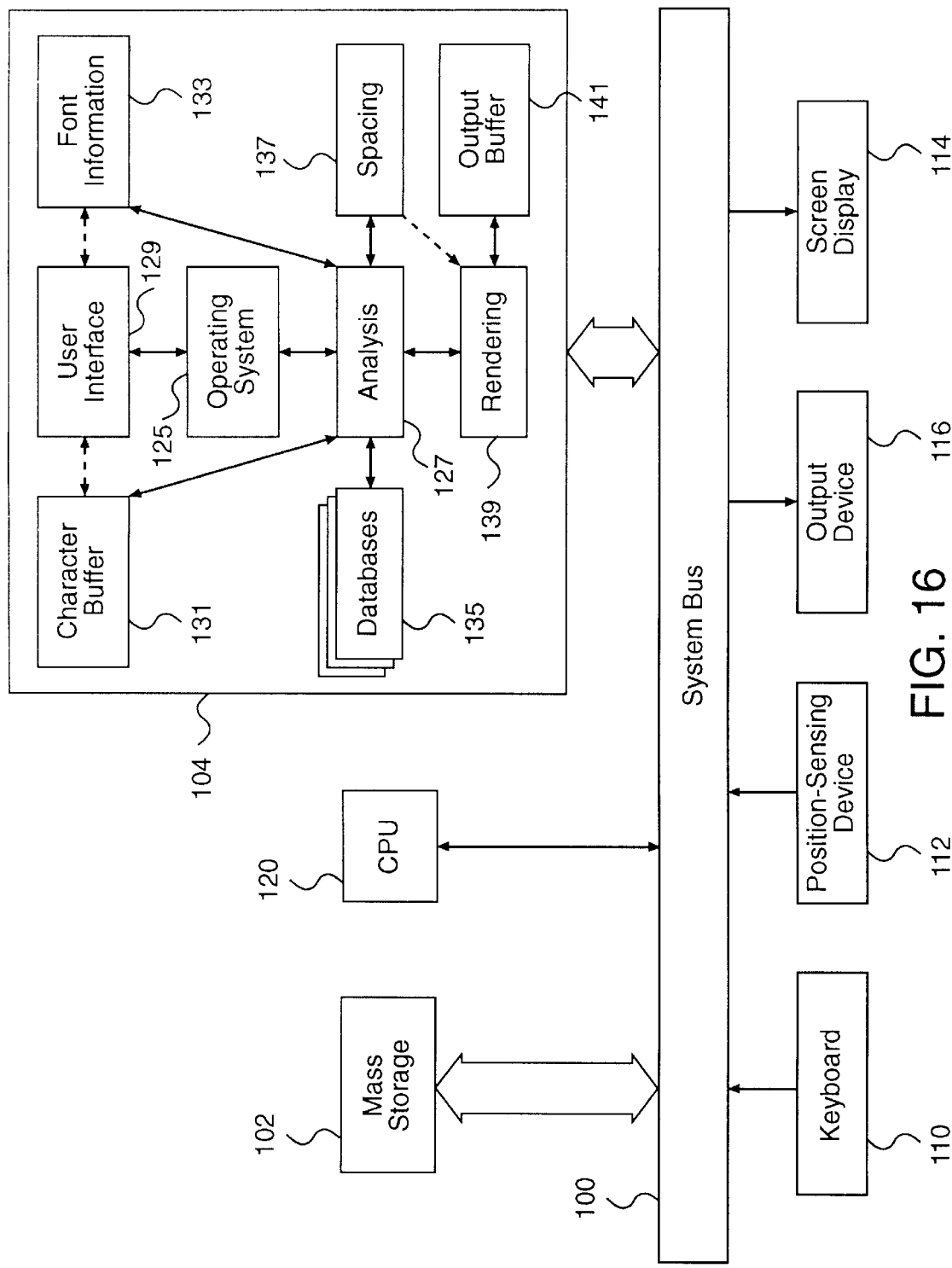
FIG. 16 schematically illustrates a representative hardware environment for the present invention.

Refer now to FIG. 16, which illustrates, in block-diagram form, a hardware system embodying the invention. As indicated therein, the system includes a bidirectional system bus 100 over which all system components communicate, a mass storage device (such as a hard disk or optical storage unit) 102, and a main system memory 104 (which, as described below, is partitioned into operative modules, buffers and databases for implementing the various functions of the invention). The user enters characters to be rendered in accordance with the invention by means of a keyboard 110 and/or a position-sensing device (e.g., a mouse) 112. Either device can also be used to designate information or select particular areas of a screen display 114 to direct functions to be performed by the system. Rendered characters are shown on screen display 114 and rendered on an output device 116 (e.g., a printer) as discussed below.

The operation of the illustrated system is directed by a central-processing unit ("CPU") 120. The main memory 104 contains a group of operative modules that control, by means of executable instructions, the operation of CPU 120 and its interaction with the other hardware components. An operating system 125 directs the execution of low-level, basic system functions such as memory allocation, file management, operation of mass storage devices 102, and encoding of user-entered characters in ASCII format. At a higher level, an analysis module 127, implemented as a series of stored instructions, directs execution of the primary functions performed by the invention. Instructions defining a user interface 129 allow straightforward interaction over screen display 114. User interface 129 generates words and/or graphical images on display 114 to prompt action by the user, accepting user commands and entered characters from keyboard 110 and/or position-sensing device 112.

User interface 129 stores user-entered characters in a character buffer 131. Font information describing the style in which the characters are ultimately to be rendered is stored in a memory partition 133. This information may originate directly with the user; more typically, however, the invention is implemented in conjunction with an application program such as a word processor or desktop publishing system, which supplies the font information (e.g., by default or in response to user specification).

A series of databases 135 store the various arrays (e.g., the Character Displacement array, the No Flags array, etc.), discussed above, that are generated in the course of the invention's operation. Application, by analysis module 127, of the above-described kerning techniques results in a set of spacing distances between pairs of characters stored in character buffer 131. The generated spacings are stored in a spacing partition 137. The combination of characters from buffer 131 and spacings from partition 137 are used by analysis module 127 to drive a conventional rendering engine 139, which actually renders the characters by generating output-ready character representations and storing these in an output buffer 141.

The contents of output buffer 141 may define a "raster," i.e., a regular two-dimensional pattern of discrete pixel positions that collectively represent an image and may be used to drive (e.g., by means of conventional device-driver software) output device 116 to print that image. The contents of each memory location in the output buffer directly govern the appearance of a corresponding pixel on display 114 and output device 116.

It must be understood that although the modules of main memory 104 have been described separately, this is for clarity of presentation only; so long as the system performs all necessary functions, it is immaterial how they are distributed within the system and the programming or hardware architecture thereof. Although the functionality of the invention is typically embodied in analysis module 127, dashed lines appearing within memory 104 illustrate effective interactions among some of the components.

In an exemplary mode of operation, the user enters a series of characters via keyboard 110, and these are stored in buffer 131. Based on the characters and their font (or fonts), analysis module 127 sets an intercharacter spacing between each pair of characters by assessing, as described above, the portions of the character contours that are opposed to one another along the rendering axis. The final spacing amount is derived by analysis of a portion of these intercharacter contour distances (as dictated, for example, by a fixed filter percentage or by a filter percentage derived from the degree of character overlap at varying levels of superimposition), and preferably by a statistical analysis of those distances.

User interface 129 is preferably configured to permit the user to modify the intercharacter spacing itself, or any of various factors contributing to the spacing, until the characters appearing on display 114 are typeset in a satisfactory manner. In particular, interface 129 desirably provides graphical representations of a series of "slide" switches, manipulation of which (using mouse 112) alters any of a variety of variables such as the portion or fraction of the intercharacter contour distances that are analyzed, the filter percentage, or the final intercharacter spacing itself as a proportion of the computed spacing.

It should be stressed that the foregoing implementation is exemplary only. Other hardware approaches are possible— for example, the various modules of the invention can be implemented on a general-purpose computer using appropriate software instructions, or as hardware circuits, or as mixed hardware-software combinations. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for setting character placement for rendering on an output device, the apparatus comprising:
   a. means for storing specifications of at least two characters to be rendered adjacently along a spacing axis, the specifications including a font associated with each of the characters, each character having an associated interior portion defined by a surrounding contour, adjacent characters having opposed contour segments separated, at an initial intercharacter spacing, along the spacing axis by a plurality of intercharacter contour distance measurements between the opposed contour segments, each intercharacter contour distance measurement being taken in a direction parallel to the spacing axis at a different location along an axis perpendicular to the spacing axis; and
   b. means for analyzing at least some of the intercharacter contour distance measurements and deriving therefrom a final intercharacter spacing between pairs of adjacent characters along the spacing axis.

2. The apparatus of claim 1 wherein the intercharacter distance measurements define a range from a smallest distance measurement to a largest distance measurement, the intercharacter contour distance measurements upon which the intercharacter spacing is based being a fraction of the range beginning with the smallest distance measurement.

3. The apparatus of claim 2 wherein the fraction consists of all distances no greater than 33% of the largest distance.

4. The apparatus of claim 2 wherein the fraction extends from the smallest distance measurement to an intermediate distance measurement, tile intermediate distance measurement being specified by a filter percentage multiplied by the largest distance measurement.

5. The apparatus of claim 4 wherein the filter percentage is determined by overlap among interior portions of adjacent characters at a plurality of degrees of superimposition.

6. The apparatus of claim 4 wherein, at each of a plurality of degrees of superimposition, adjacent characters have an intersection height and an intersection zone, the filter percentage being determined by the ratio of the intersection height to the intersection zone at a plurality of degrees of superimposition.

7. The apparatus of claim 4 wherein the filter percentage is 0.78.

8. The apparatus of claim 4 wherein the opposed contour segments have rates of change associated therewith, the filter percentage being determined by the rates of change.

9. The apparatus of claim 1 further comprising user-responsive means for altering how many intercharacter contour distance measurements the intercharacter spacing is based upon.

10. The apparatus of claim 2 further comprising user-responsive means for altering the fraction.

11. The apparatus of claim 4 further comprising user-responsive means for altering the filter percentage.

12. The apparatus of claim 1 further comprising user-responsive means for altering the final intercharacter spacing in proportion thereto.

13. The apparatus of claim 1 wherein the intercharacter spacing is set based on a statistical measure of a portion of the intercharacter contour distance measurements.

14. The apparatus of claim 13 wherein the statistical measure is at least one of standard deviation, mean, first quartile and third quartile.

15. The apparatus of claim 1 further comprising:
   a. user-responsive means for receiving user selections of characters; and
   b. means for storing, in the storage means, codes specifying the characters.

16. The apparatus of claim 1 wherein the initial intercharacter spacing between a pair of adjacent characters, which have an associated font having a font height and a font width, is determined by at least one of (a) a percentage of the font height and (b) a ratio of font height to font width.

17. The apparatus of claim 1 wherein one of said characters is larger than the other of said characters, the initial intercharacter spacing between first and second adjacent charactersis being determined by one of (a) the height of an upper-case version of the larger of said characters or (b) a total font height.

18. The apparatus of claim 1 wherein the initial intercharacter spacing is determined by a vertical character stem width.

19. The apparatus of claim 1 wherein the initial character spacing value is a touch distance, the touch distance specifying a distance along the axis such that displacement by said distance of one of the characters toward the other along the axis causes the opposed contour segments to touch but not overlap.

20. The apparatus of claim 4 wherein the filter percentage is adjusted if the adjacent characters (a) have one close point, (b) have two close points, (c) have three close points, or (d) have one close point and an exverted diagonal.

21. The apparatus of claim 13 wherein the final intercharacter spacing is determined by subtracting the statistical measure from the initial intercharacter spacing to produce a difference, and subtracting the difference from a touch distance to produce a final intercharacter spacing, the touch distance specifying a distance along the axis such that displacement by said distance of one of the characters toward the other along the axis causes the opposed contour segments to touch.

22. The apparatus of claim 1 wherein the intercharacter measurements comprise a range from a smallest distance measurement to a largest distance measurement and the final intercharacter spacing is adjusted based on at least one of:
   a. relative sizes of the adjacent characters;
   b. the font;
   c. whether the characters comprise serifs; and
   d. a ratio of (i) a fraction of the range beginning with the smallest distance measurement and ending at an intermediate distance measurement, and (ii) a fraction of the range beginning at the intermediate distance measurement and ending at the largest distance measurement.

23. The apparatus of claim 1 further comprising:
   a. means for generating output-ready character representations based on the final intercharacter spacing; and
   b. means for driving an output device to render the characters based on the representations.

24. A rendering device for outputting characters, the device comprising:
   a. means for storing specifications of at least two characters to be rendered adjacently along a spacing axis, the specifications including a font associated with each of the characters, each character having an associated interior portion defined by a surrounding contour, adjacent characters having opposed contour segments separated, at an initial intercharacter spacing, along the spacing axis by a plurality of intercharacter contour distance measurements between the opposed contour segments, each intercharacter contour distance measurement being taken in a direction parallel to the spacing axis at a different location along an axis perpendicular to the spacing axis;

b. means for analyzing at least some of the intercharacter contour distance measurements and deriving therefrom a final intercharacter spacing between pairs of adjacent characters along the spacing axis; and c. means for outputting the characters in accordance with the final intercharacter spacings.

25. A method of setting character placement for rendering on an output device, the method comprising;

a. providing specifications of at least two characters to be rendered adjacently along a spacing axis, the specifications including a font associated with each of the characters, each character having an associated interior portion defined by a surrounding contour, adjacent characters having opposed contour segments separated, at an initial intercharacter spacing, along the spacing axis by a plurality of intercharacter contour distance measurements between the opposed contour segments, each intercharacter contour distance measurement being taken in a direction parallel to the spacing axis at a different location along an axis perpendicular to the spacing axis; and b. analyzing at least some of the intercharacter contour distance measurements to derive a final intercharacter spacing between pairs of adjacent characters along the spacing axis.

26. The method of claim 25 wherein the intercharacter distance measurements define a range from a smallest distance measurement to a largest distance measurement, the intercharacter contour distance measurements upon which the intercharacter spacing is based being a fraction of the range beginning with the smallest distance measurement.

27. The method of claim 26 wherein the fraction consists of distances no greater than 33% of the largest distance.

28. The method of claim 26 wherein the fraction extends from the smallest distance measurement to an intermediate distance measurement, the intermediate distance measurement being specified by a filter percentage multiplied by the largest distance measurement.

29. The method of claim 28 wherein the filter percentage is determined by overlap among interior portions of adjacent characters at a plurality of degrees of superimposition.

30. The method of claim 28 wherein the filter percentage is 0.78.

31. The method of claim 28 wherein the opposed contour segments have rates of change associated therewith, the filter percentage being determined by the rates of change.

32. The method of claim 25 wherein the intercharacter spacing is set based on a statistical measure of a portion of the intercharacter contour distance measurements.

33. The method of claim 32 wherein the statistical measure is at least one of standard deviation, mean, first quartile and third quartile.

34. The method of claim 25 wherein the initial intercharacter spacing between a pair of adjacent characters, which have an associated font having a font height and a font width, is determined by at least one of (a) a percentage of the font height and (b) a ratio of font height to font width.

35. The method of claim 25 wherein one of said characters is larger than the other of said characters, the initial intercharacter spacing between first and second adjacent charactersis being determined by the height of an upper-case version of the larger of said characters.

36. The method of claim 25 wherein the initial intercharacter spacing is determined by a vertical character stem width.

37. The method of claim 25 wherein the initial character spacing value is a touch distance, the touch distance specifying a distance along the axis such that displacement by said distance of one of the characters toward the other along the axis causes the opposed contour segments to touch.

38. The method of claim 28 further comprising the step of adjusting the filter percentage if the adjacent characters (a) have one close point, (b) have two close points, (c) have three close points, or (d) have one close point and an exverted diagonal.

39. The method of claim 32 wherein the final intercharacter spacing is determined by steps comprising subtracting the statistical measure from the initial intercharacter spacing to produce a difference, and subtracting the difference from a touch distance to produce a final intercharacter spacing, the touch distance specifying a distance along the axis such that displacement by said distance of one of the characters toward the other along the axis causes the opposed contour segments to touch.

40. The method of claim 25 wherein the intercharacter distance measurements comprise a range from a smallest distance measurement to a largest distance measurement and the final intercharacter spacing is adjusted based on at least one of:

a. relative sizes of the adjacent characters;

b. the font;

c. whether the characters comprise serifs; and d. a ratio of (i) a fraction of the range beginning with the smallest distance measurement and ending at an intermediate distance measurement, and (ii) a fraction of the range beginning at the intermediate distance measurement and ending at the largest distance measurement.

41. The method of claim 25 further comprising the steps of:

a. generating output-ready character representations based on the final intercharacter spacing; and b. driving an output device to render the characters based on the representations.

* * * * *